(12) United States Patent
Boulet et al.

(10) Patent No.: US 11,117,088 B2
(45) Date of Patent: Sep. 14, 2021

(54) ADSORPTIVE GAS SEPARATION EMPLOYING STEAM FOR REGENERATION

(71) Applicant: INVENTYS THERMAL TECHNOLOGIES INC., Burnaby (CA)

(72) Inventors: Andre Boulet, Bowen Island (CA); Soheil Khiavi, North Vancouver (CA)

(73) Assignee: Svante Inc., Burnaby (CA)

( * ) Notice: Subject to any disclaimer, the term of this patent is extended or adjusted under 35 U.S.C. 154(b) by 107 days.

(21) Appl. No.: 16/089,747

(22) PCT Filed: Mar. 31, 2017

(86) PCT No.: PCT/CA2017/050396
§ 371 (c)(1),
(2) Date: Sep. 28, 2018

(87) PCT Pub. No.: WO2017/165977
PCT Pub. Date: Oct. 5, 2017

(65) Prior Publication Data
US 2019/0105596 A1    Apr. 11, 2019

Related U.S. Application Data

(60) Provisional application No. 62/316,486, filed on Mar. 31, 2016.

(51) Int. Cl.
*B01D 53/06*  (2006.01)
*B01D 53/047* (2006.01)
(Continued)

(52) U.S. Cl.
CPC ......... *B01D 53/047* (2013.01); *B01D 53/002* (2013.01); *B01D 53/0462* (2013.01);
(Continued)

(58) Field of Classification Search
CPC ................... B01D 53/002; B01D 53/0462; B01D 53/047; B01D 53/06
See application file for complete search history.

(56) References Cited

U.S. PATENT DOCUMENTS 2,545,194 A    3/1951  Colburn et al.
RE29,941 E *   3/1979  Bird ..................... B01D 53/047
                                                                95/11
(Continued)

FOREIGN PATENT DOCUMENTS

CA    2896836       7/2014
CA    2896836 A1    7/2014
(Continued)

OTHER PUBLICATIONS

US 9,278,305 B2, 03/2016, Chen et al. (withdrawn)
(Continued)

*Primary Examiner* — Jonathan Miller
(74) *Attorney, Agent, or Firm* — Voyer Law

(57) ABSTRACT

An adsorptive gas separation process and system is provided for separating at least a first component from a multi-component fluid mixture, or specifically for separating at least a first component from a post-combustion gas stream produced by a fuel combustor. The adsorptive gas separation process and system employs a steam stream during at least one regenerating step at sub-ambient pressure.

74 Claims, 12 Drawing Sheets

US 11,117,088 B2
Page 2

(51) Int. Cl.
*B01D 53/00* (2006.01)
*B01D 53/04* (2006.01)

(52) U.S. Cl.
CPC ........ *B01D 53/06* (2013.01); *B01D 2257/302* (2013.01); *B01D 2257/404* (2013.01); *B01D 2257/504* (2013.01); *B01D 2258/0283* (2013.01); *B01D 2259/4009* (2013.01); *Y02C 20/40* (2020.08)

(56) References Cited

U.S. PATENT DOCUMENTS

| | | | |
|---|---|---|---|
| 4,468,238 A | | 8/1984 | Matsui et al. |
| 5,176,722 A | * | 1/1993 | Lemcoff ............ B01D 53/0476 95/102 |
| 5,256,295 A | | 10/1993 | Baker et al. |
| 5,507,857 A | * | 4/1996 | Kumar ................. B01D 53/047 95/101 |
| 5,906,673 A | * | 5/1999 | Reinhold, III ....... B01D 53/047 95/45 |
| 6,322,612 B1 | * | 11/2001 | Sircar .................. B01D 53/047 95/97 |
| 6,527,836 B1 | | 3/2003 | White, Jr. et al. |
| 7,101,414 B2 | | 9/2006 | Dinnage et al. |
| 7,166,149 B2 | | 1/2007 | Dunne et al. |
| 7,713,421 B2 | | 5/2010 | Galbraith |
| 7,731,782 B2 | | 6/2010 | Kelley et al. |
| 7,736,416 B2 | | 6/2010 | Nalette et al. |
| 7,795,479 B1 | * | 9/2010 | Wegerer ............. B01D 53/0462 568/916 |
| 7,905,097 B1 | | 3/2011 | Fort |
| 8,128,734 B2 | * | 3/2012 | Song .................... C01B 21/045 95/96 |
| 8,500,852 B2 | | 8/2013 | Galbraith |
| 8,535,417 B2 | | 9/2013 | Shah |
| 8,858,683 B2 | | 10/2014 | Deckman |
| 8,951,490 B2 | | 2/2015 | Okumura et al. |
| 9,103,549 B2 | | 8/2015 | Galasso |
| 9,146,035 B2 | * | 9/2015 | Boulet ............... B01D 53/0462 |
| 9,249,996 B2 | | 2/2016 | Stallmann et al. |
| 9,884,282 B2 | * | 2/2018 | Boulet ................. B01D 53/047 |
| 10,174,943 B2 | * | 1/2019 | Boulet ................. B01D 53/047 |
| 2005/0150378 A1 | | 7/2005 | Dunne et al. |
| 2005/0235827 A1 | | 10/2005 | Dinnage et al. |
| 2007/0221060 A1 | * | 9/2007 | Song .................... B01D 53/047 95/100 |
| 2008/0202339 A1 | | 8/2008 | Nalette et al. |
| 2009/0018668 A1 | | 1/2009 | Galbraith |
| 2010/0012000 A1 | | 1/2010 | Gordon |
| 2010/0043633 A1 | | 2/2010 | Galbraith |
| 2010/0080745 A1 | | 4/2010 | Degenstein et al. |
| 2010/0242728 A1 | | 9/2010 | Radosz et al. |
| 2012/0125194 A1 | | 5/2012 | Caram et al. |
| 2012/0131897 A1 | | 5/2012 | Gonzalez et al. |
| 2013/0327216 A1 | | 12/2013 | Deckman et al. |
| 2014/0137780 A1 | * | 5/2014 | Boulet ............... B01D 53/0462 110/345 |
| 2014/0175336 A1 | | 6/2014 | Gupta et al. |
| 2015/0135951 A1 | | 5/2015 | Chen et al. |
| 2015/0135952 A1 | | 5/2015 | Chen et al. |
| 2015/0251129 A1 | | 9/2015 | Heirman et al. |
| 2015/0375161 A1 | | 9/2015 | Boulet |
| 2015/0338098 A1 | * | 11/2015 | Boulet ...................... F23L 7/00 423/228 |
| 2016/0010551 A1 | | 1/2016 | Allam et al. |
| 2016/0010852 A1 | | 1/2016 | Slavens et al. |
| 2016/0121261 A1 | | 5/2016 | Lee et al. |

FOREIGN PATENT DOCUMENTS

| | | | | |
|---|---|---|---|---|
| CN | 101148390 B | | 11/2010 | |
| EP | 1004343 A1 | * | 5/2000 | ........... B01D 53/047 |
| WO | 2008143964 A1 | | 11/2008 | |
| WO | 2008147676 A1 | | 12/2008 | |
| WO | 2013003955 A1 | | 1/2013 | |
| WO | 2014073004 A2 | | 5/2014 | |
| WO | 2014100904 A1 | | 7/2014 | |
| WO | 2015052726 A1 | | 4/2015 | |
| WO | 2015056272 A2 | | 4/2015 | |
| WO | 2016003484 A2 | | 1/2016 | |
| WO | 2016005226 A1 | | 1/2016 | |

OTHER PUBLICATIONS

ESPACENET Translation of EP 1004343 A1 obtained Oct. 20, 2020. (Year: 2020).*
International Search Report for PCT/CA2017/050396.
Written Opinion for PCT/CA2017/050396.

* cited by examiner

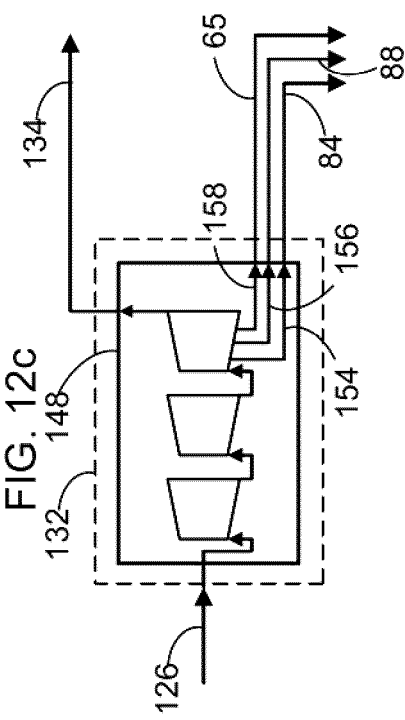
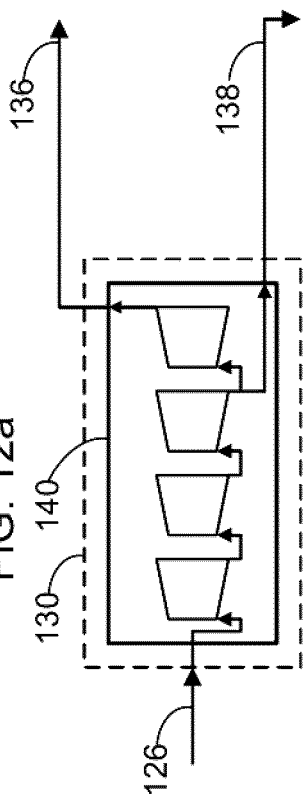
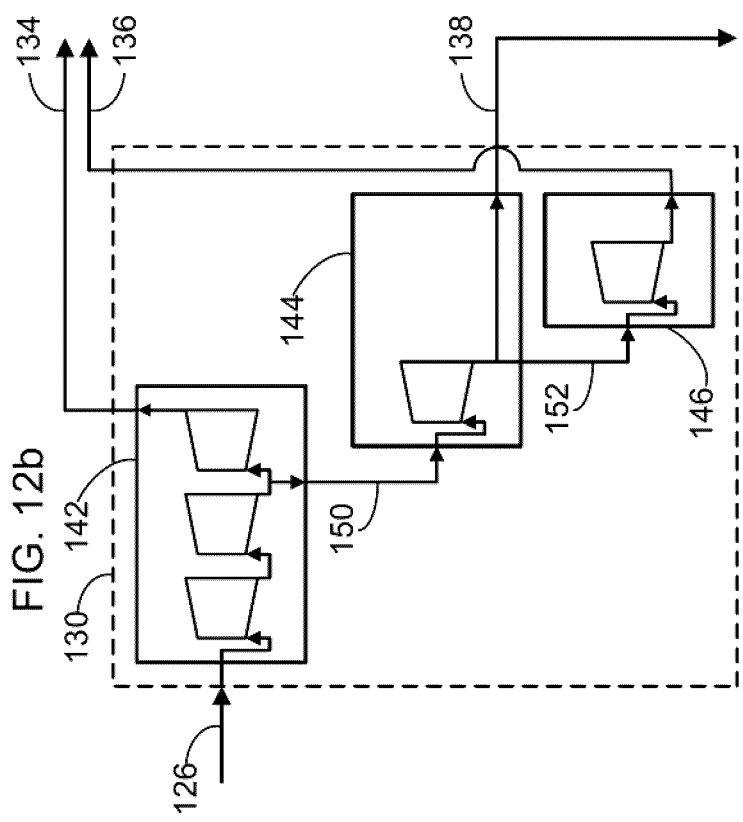

ADSORPTIVE GAS SEPARATION EMPLOYING STEAM FOR REGENERATION

TECHNICAL FIELD

The present technology relates generally to processes for adsorptive gas separation of a multi-component fluid mixture and systems therefore. More particularly, the present technology relates to processes for adsorptive gas separation of a first component from a post-combustion gas stream produced by a fuel combustor and systems incorporating the same.

BACKGROUND

In conventional adsorptive gas separation processes, the energy consumed for regeneration of an adsorbent material in an adsorptive gas separator typically represents a large portion of the operating cost, which offers barriers to wide adaptation and implementation of the technology. With conventional temperature swing adsorptive gas separation processes it may be desirable to employ a condensable gas stream, for example, a steam stream, as a regeneration stream in order to recover a product stream which is high in purity. However, employing a steam stream for desorption of one or more components adsorbed on the adsorbent material in conventional systems may offer challenges including, for example, condensation of the steam stream within the adsorptive gas separator which may result in adsorption of the condensed steam on the adsorbent material, and in some applications, it may be undesirable to employ a steam stream high in exergy which may be otherwise employed for another process. An adsorptive gas separation process and system which reduces the condensation of steam, the consumption of steam high in exergy, and operating cost is desired.

SUMMARY

In various embodiments according to the present disclosure, an adsorptive gas separation process for separating at least a first component from a multi-component fluid mixture is provided. In one such embodiment, a process is provided, comprising the steps of:

admitting a multi-component fluid mixture comprising at least a first component, at a pressure equal to or greater than a first pressure threshold, as a feed stream into an adsorptive gas separator further comprising at least one adsorbent material in at least one contactor, adsorbing at least a first component on the at least one adsorbent material in at least a portion of the at least one contactor, forming a first product stream depleted in the first component relative to the feed stream, and recovering the first product stream from the at least a portion of the at least one contactor and the adsorptive gas separator;

admitting at least a portion of a first regeneration stream into the adsorptive gas separator and the at least a portion of at least one contactor, desorbing at least a portion of the first component adsorbed on the at least one adsorbent material in the at least a portion of at least one contactor, forming a second product stream enriched in at least one of the first component and the second component relative to the feed stream, recovering the second product stream from the at least a portion of at least one contactor and the adsorptive gas separator, admitting the second product stream into at least a first condenser, causing at least a portion of the second component in at least the second product stream to condense, forming at least a portion of a purified second product stream and at least a portion of a first condensate stream, inducing a reduction in pressure in at least a portion of the adsorptive gas separator and the at least a portion of at least one contactor, to a pressure of equal to or less than a second pressure threshold, and recovering the purified second product stream and the first condensate stream from the condensing heat exchanger, and admitting a conditioning stream into the adsorptive gas separator and the at least a portion of at least one contactor, increasing a pressure of the at least a portion of the at least one contactor to a pressure greater than the second pressure threshold, forming a third product stream and recovering the third product stream from the at least a portion of at least one contactor and the adsorptive gas separator.

In a further embodiment of the present disclosure, an adsorptive gas separator for separating at least a first component from a multi-component fluid mixture is provided. In one such embodiment, the adsorptive gas separator may comprise: a first zone, a second zone, a third zone, a fourth zone, a fifth zone, a sixth zone, and a seventh zone; and at least one contactor comprising at least one adsorbent material, where the at least one contactor is operable to cycle through the first zone, the second zone, the third zone, the fourth zone, the fifth zone, the sixth zone, and the seventh zone, and where the first zone is fluidly connected to receive the multi-component fluid mixture as a feed stream, the second zone and the sixth zone are fluidly connected, the third zone and the fourth zone are fluidly connected the fifth zone and the seventh zone are fluidly connected to an ambient environment.

BRIEF DESCRIPTION OF THE DRAWINGS

FIG. 2b is a flowchart illustrating an adsorptive gas separation process according to a further embodiment of the present disclosure, where the process steps are in an alternative sequence to those of the adsorptive gas separation process in FIG. 2a.

FIG. 12a is a schematic diagram of an exemplary steam subsystem configured with a first steam turbine which may be employed with an exemplary embodiment adsorptive gas separation system in FIGS. 7, 8, and 10.

FIG. 12b is a schematic diagram of an exemplary steam subsystem configured with a first steam turbine, a second steam turbine, and a third steam turbine according to an embodiment of the present disclosure, which in one aspect may be employed with an exemplary adsorptive gas separation system such as those shown in the embodiments in FIGS. 7, 8, and 10.

FIG. 12c is a schematic diagram of an exemplary steam subsystem configured with a first steam turbine forming a plurality of steam streams according to an embodiment of the present disclosure, which in one aspect may be employed with an exemplary adsorptive gas separation system such as those shown in the embodiments in FIGS. 9 and 11.

Like reference numerals refer to corresponding parts throughout the several views of the drawings.

DETAILED DESCRIPTION

Figure 1:
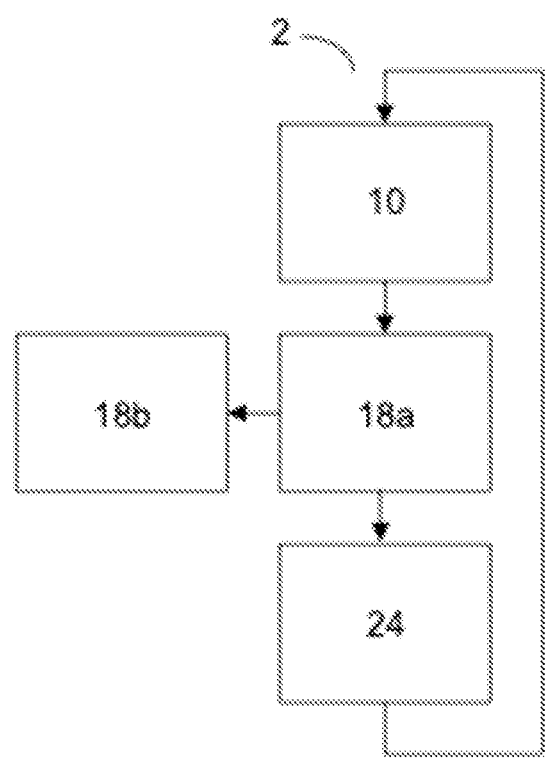
FIG. 1 is a flowchart illustrating an adsorptive gas separation process according to an embodiment of the present disclosure.

In a process embodiment, an adsorptive gas separation process is provided for separating at least a first component, for example, carbon dioxide, sulfur oxides, or nitrogen oxides, from a multi-component fluid mixture or stream, for example, a flue gas stream or a post-combustion gas stream produced by a fuel combustor, in an adsorptive gas separation assembly. The adsorptive gas separation process may be particularly suitable for, for example, separation of carbon dioxide from a post-combustion gas stream of a fuel combustor.

FIGS. 1, 2a, 2b, 3a, and 3b, are flowcharts illustrating exemplary adsorptive gas separation processes according to embodiments of the present disclosure which may be employed with an exemplary adsorptive gas separation assembly comprising at least one adsorptive gas separator fluidly connected to at least one pressure reducing device, for example, a condensing heat exchanger, an ejector, and/or a vacuum pump. An adsorptive gas separation assembly may be configured with at least one adsorptive gas separator comprising at least one contactor housed in an enclosure, where the enclosure may assist in defining and substantially fluidly separating one or more zones (for example, an adsorption zone, a de-pressurization zone, a pre-regeneration zone, a first regeneration zone, a second regeneration zone, a third regeneration zone, a reflux zone, a pressurization zone, a fourth regeneration zone, and a conditioning zone) within the enclosure. The one or more zones may be configured to move relative to the contactor (for example, where optional zones may move and cycle through stationary contactors) or configured to be stationary relative to the contactor (for example, where the optional zones may remain stationary while a contactor may move and cycle through the optional zones). An adsorptive gas separation assembly may also be configured having a plurality of stationary or moving adsorptive gas separators, where each adsorptive gas separator comprise at least one contactor housed in an enclosure, and each adsorptive gas separator may be representative of a zone. Optionally, a contactor comprises a plurality of substantially parallel walls which define a plurality of substantially parallel fluid flow passages, optionally oriented along a longitudinal axis of the contactor between a first end and a second end which are axially opposed, at least one adsorbent material in and/or on the walls of the contactor, and optionally a plurality of axially substantially continuous thermally conductive filaments optionally in direct contact with the at least one adsorbent material. Suitable adsorbent materials include but are not limited to, for example, desiccant, activated carbon, graphite, carbon molecular sieve, activated alumina, molecular sieve, aluminophosphate, silicoaluminophosphate, zeolite adsorbent, ion exchanged zeolite, hydrophilic zeolite, hydrophobic zeolite, modified zeolite, natural zeolites, faujasite, clinoptilolite, mordenite, metal-exchanged silico-aluminophosphate, uni-polar resin, bi-polar resin, aromatic cross-linked polystyrenic matrix, brominated aromatic matrix, methacrylic ester copolymer, carbon fiber, carbon nanotube, nano-materials, metal salt adsorbent, perchlorate, oxalate, alkaline earth metal particle, ETS, CTS, metal oxide, supported alkali carbonates, alkali-promoted hydrotalcites, chemisorbent, amine, organo-metallic reactant, and metal organic framework adsorbent materials, and combinations thereof.

Referring to FIG. 1, an exemplary adsorptive gas separation process 2 according to an embodiment of the present disclosure, may be employed for separating at least a first component from a multi-component fluid mixture or stream, comprising an adsorbing step 10, a first regenerating step 18a, a condensing step 18b, and a conditioning step 24. Adsorbing step 10, first regenerating step 18a and conditioning step 24 may be repeated cyclically in at least one adsorptive gas separator. Optionally, all steps in adsorptive gas separation process 2 may occur substantially simultaneously in an adsorptive gas separation assembly. Adsorptive gas separation process 2 may be suited for adsorptive gas separation applications where it is desirable to reduce the formation of condensation during an adsorptive gas separation process, reduce energy consumption while operating at sub-ambient pressures, and/or reduce operating cost.

Adsorbing step 10 comprises, admitting a feed stream (for example, a multi-component fluid mixture or a post-combustion gas stream) into an adsorptive gas separation assembly, adsorptive gas separator, an optional adsorption zone of the adsorptive gas separator, and a first end of at least a portion of a contactor, to flow in a direction substantially towards a second end of the contactor; adsorbing at least a portion of a first component (for example, carbon dioxide, sulfur oxides, or nitrogen oxides) of the feed stream on at least one adsorbent material on at least a portion of the contactor in the optional adsorption zone; forming a first product stream at least periodically depleted in the first component relative to the feed stream, and recovering the first product stream optionally from the second end of the contactor, optional adsorption zone, adsorptive gas separator and adsorptive gas separation assembly. Optionally, at least a portion of the first product stream (for example, about breakthrough of the first component from the second end of the contactor) may be recovered from the contactor and adsorbing zone, and may be periodically recycled by admitting the at least a portion of the first product stream as a portion of the feed stream into the adsorbing zone and contactor. The feed stream may be at a temperature equal or less than a first temperature threshold (for example, about 50° C., or specifically about 40° C., or more specifically about 30° C.) and at a pressure of equal to or greater than a first pressure threshold, for example, about an atmospheric pressure, or about 100 kilopascal absolute (herein referred as "$kPa_{abs}$"), such as when an adsorptive gas separation assembly is at an elevation of about sea level (and which atmospheric pressure may be understood to vary depending on factors such as elevation, location and ambient conditions for a particular adsorptive gas separation assembly). Adsorbing step 10 may be terminated when at least one condition have been achieved, for example, at a predetermined time, at a predetermined event, when a pre-determined amount of the first component is detected in the first product stream at a location near, at or after the second end of a contactor, or when a pre-determined temperature measured at a location near, or at the second end of a contactor is achieved.

First regenerating step 18a, comprises, admitting at least a portion of a first regeneration stream comprising a second component, for example, water (herein referred as "$H_2O$") in the form of steam, into the adsorptive gas separation assembly, adsorptive gas separator, first regeneration zone, and optionally the second end of the contactor, to flow in a direction optionally substantially towards the first end of the contactor; optionally adsorbing at least a portion of the second component of the first regeneration stream on the at least one adsorbent material in the contactor; desorbing at least a portion of the first component adsorbed on the at least one adsorbent material in the contactor in the first regeneration zone; forming a second product stream at least periodically enriched in at least one of the first component and/or second component relative to the feed stream, and recovering the second product stream from the contactor, first regeneration zone, and adsorptive gas separator.

During first regenerating step 18a, the quantity or volume of the at least a portion of a first regeneration stream admitted into the adsorptive gas separation assembly, adsorptive gas separator, first regeneration zone, and at least a portion of the contactor, may be at a quantity or volume suitable to form a second product stream with a suitable quantity or volume such that during condensing step 18b the condensation of the second component in the second product stream may induce the reduction of pressure or vacuum in the condenser or condensing heat exchanger to a pressure equal to or less than about a second pressure threshold (such as for example, about 70 $kPa_{abs}$, or specifically about 50 $kPa_{abs}$, or more specifically about 30 $kPa_{abs}$, or most specifically about 20 $kPa_{abs}$). The pressure of the at least a portion of a first regeneration stream admitted into the adsorptive gas separation assembly and adsorptive gas separator may be at a pressure of equal to or less than about the first pressure threshold, or specifically, equal to or less than about the second pressure threshold. Reducing and/or maintaining the reduction in pressure in the adsorptive gas separator and at least a portion of a contactor during regeneration step 18a may advantageously enable a vacuum desorption mechanism, reduce the condensation of the first regeneration stream or second component in the at least a portion of a contactor, reduce the desire for a first regeneration stream high in exergy or enable the employment of a first regeneration stream low in exergy (for example, a steam stream at a pressure of equal to or less than about the first pressure threshold), and reduce the quantity or volume of a first regeneration stream desired to desorb the at least one components adsorbed on the at least one adsorbent material in at least a portion of a contactor. Optionally during first regenerating step 18a, at least a portion of a first regeneration stream may be admitted into a valve (for example, a throttling valve) prior to admitting the at least a portion of a first regeneration stream into an adsorptive gas separation assembly, adsorptive gas separator or contactor.

Condensing step 18b, comprises, admitting the second product stream into at least one pressure reducing device and/or condenser (for example, a condensing heat exchanger) of a first condenser stage; causing at least a portion of the second component in the second product stream to condense; forming at least a portion of a purified second product stream and at least a portion of a first condensate stream, while inducing a reduction of pressure or a vacuum in the at least one condenser or condensing heat exchanger and fluidly connected devices (for example, adsorptive gas separator, first regeneration zone, at least a portion of a contactor, and devices upstream of the adsorptive gas separator) to a pressure equal to or less than a second pressure threshold, and recovering at least a portion of the purified second product stream and at least a portion of the first condensate stream from the at least one condenser or condensing heat exchanger, first condenser stage, and adsorptive gas separation assembly. The purified second product stream will be enriched in the first component relative to the feed stream. During condensing step 18b, employing at least one condenser or specifically a condensing heat exchanger to induce the reduction in pressure to a pressure equal to or less than the second pressure threshold in the adsorptive gas separator and at least a portion of a contactor may advantageously reduce the energy consumption of first regenerating step 18a, condensing step 18b and the adsorptive gas separation process.

During condensing step 18b, optionally at least a portion of a purified second product stream may be admitted into at least one pump (for example, an ejector, a vacuum pump, or a compressor operating at sub-ambient pressure at the inlet of the compressor) and/or valve (for example, a check valve) in the first condenser stage to induce and/or assist in maintaining a reduction of pressure or a vacuum in the at least one condenser or condensing heat exchanger and fluidly connected devices (for example, adsorptive gas separator, first regeneration zone, at least a portion of a contactor, and devices upstream of the adsorptive gas separator) to a pressure equal to or less than a second pressure threshold. Optionally, at least a portion of a purified second product stream recovered from the first condenser stage may be admitted into at least a second condenser stage where each condenser stage comprises at least one of a condenser or condensing heat exchanger, a pump, or a valve, to further condense and separate the second component from the purified second product stream, and/or further induce and/or maintain a reduction in pressure or vacuum in the fluidly connected adsorptive gas separator, first regeneration zone, and at least a portion of a contactor. Condensing step 18b optionally comprises: admitting at least a portion of a purified second product stream recovered from at least the first condenser stage into a compressor, for example, a multistage compressor with optional interstage cooling or intercooler; increasing a pressure of the purified second product stream forming a compressed second product stream; recovering the compressed second product stream from the compressor, and directing or admitting the compressed second product stream to an end use or end user of the compressed second product stream. Optionally, at least a portion of the compressed second product stream may be recovered from the compressor and admitted as a motive fluid stream into a high pressure port of at least one ejector, reducing the pressure in the ejector and fluidly connected devices, for example, condenser, condensing heat exchanger and/or at least a portion of a contactor.

Conditioning step 24 comprises, admitting a conditioning stream (for example, an air stream) at a temperature equal to or less than the first temperature threshold (for example, about 50° C., or specifically about 40° C., or more specifically about 30° C.) and at a pressure of equal to or greater than the first pressure threshold (for example, about atmospheric pressure, or about 100 kPa$_{abs}$ at an elevation of about sea level) into a adsorptive gas separation assembly, adsorptive gas separator, optional conditioning zone, and optionally the second end of the contactor, to flow in a direction optionally substantially towards the first end of the contactor; increasing the pressure of at least a portion of the adsorptive gas separator, optional conditioning zone, and contactor; reducing the temperature of the at least one adsorbent material in the contactor to a temperature equal to or less than the first temperature threshold; forming a third product stream, and recovering the third product stream from the contactor, optional conditioning zone, adsorptive gas separator and adsorptive gas separation assembly.

Figure 2B:
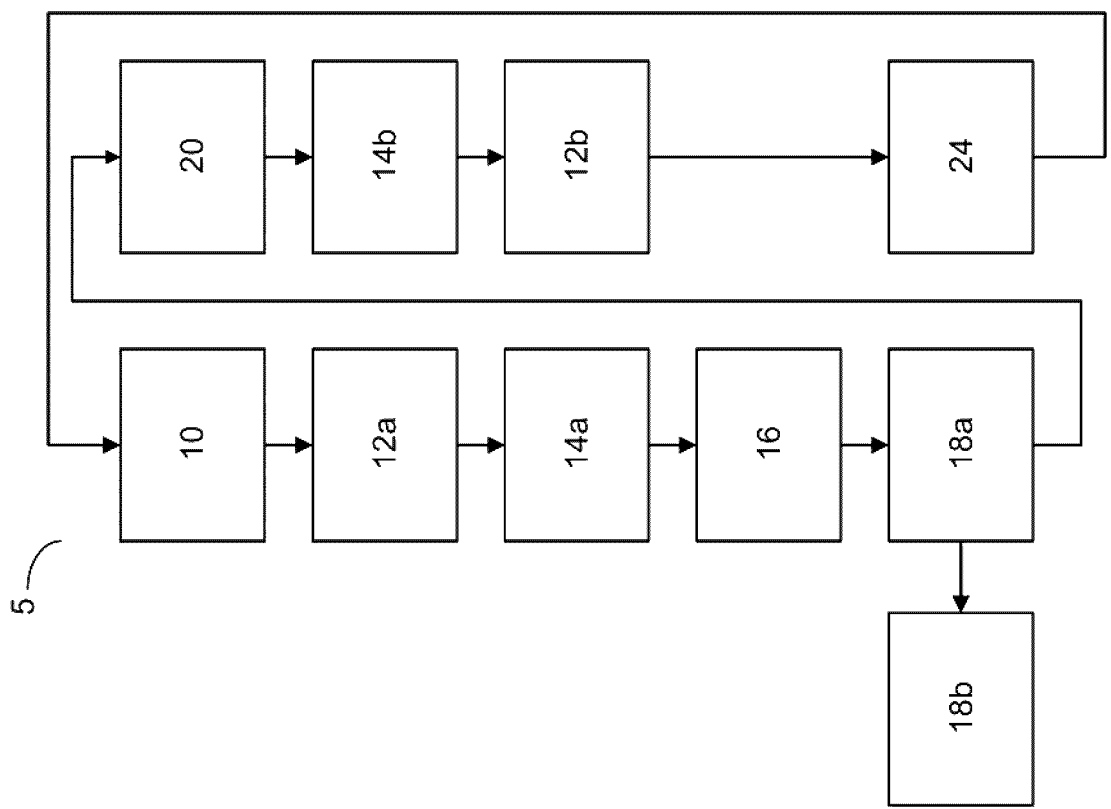
Figure 2A:
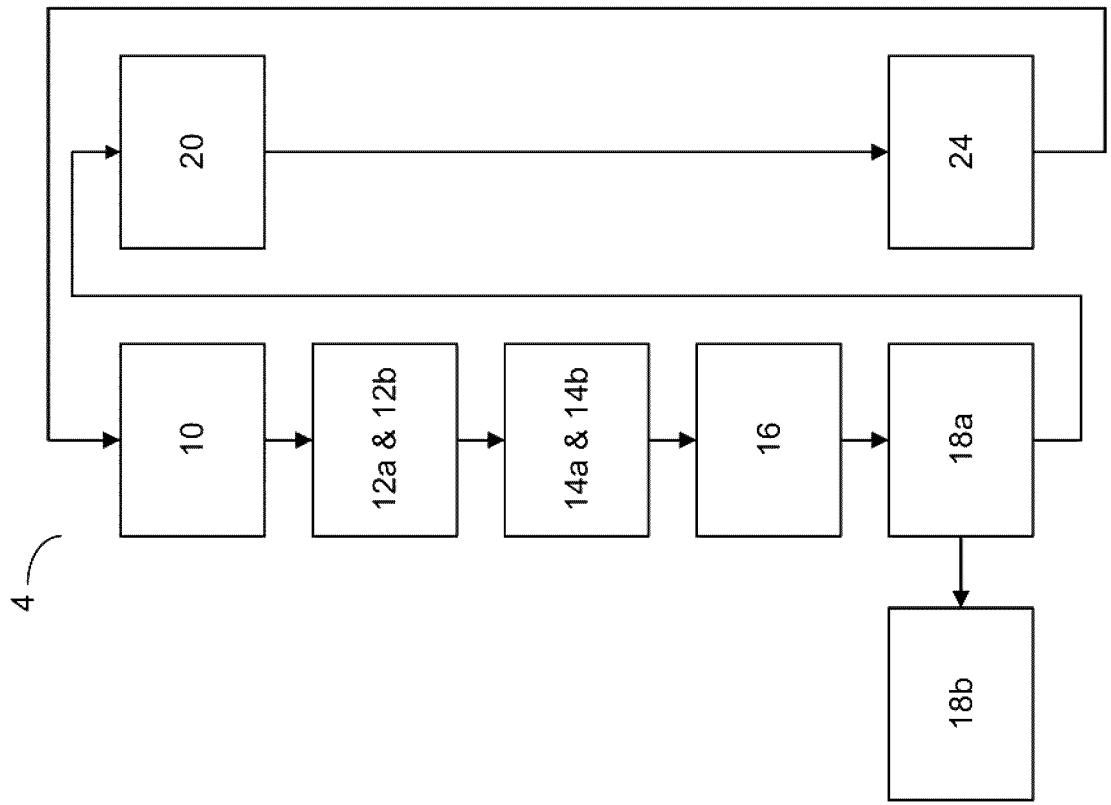
FIG. 2a is a flowchart illustrating an adsorptive gas separation process according to another embodiment of the present disclosure.

Referring to FIG. 2a, an exemplary adsorptive gas separation process 4 according to an embodiment of the present disclosure, may be employed for separating at least a first component from a multi-component fluid mixture or stream, comprising an adsorbing step 10, an optional depressurizing step 12a, an optional pressurizing step 12b, an optional pre-regeneration step 14a, an optional reflux step 14b, an optional second regenerating step 16, a first regenerating step 18a, condensing step 18b, an optional third regenerating step 20, and a conditioning step 24. Adsorbing step 10, first regenerating step 18a, condensing step 18b, and condition step 24 are employed in adsorptive gas separation process 2 in FIG. 1, and described in detail above. Adsorbing step 10, optional depressurizing step 12a, optional pressurizing step 12b, optional pre-regeneration step 14a, optional reflux step 14b, optional second regenerating step 16, first regenerating step 18a, optional third regenerating step 20, and conditioning step 24, may be repeated cyclically in at least one adsorptive gas separator. Optionally, all steps in adsorptive gas separation process 4 may occur substantially simultaneously in an adsorptive gas separation assembly. Adsorptive gas separation process 4 may be suited for adsorptive gas separation applications where it is desirable to recover a product stream high in purity, reduce the formation of condensation during the adsorptive gas separation process, reduce energy consumption while operating at sub-ambient pressures, and/or reduce operating cost.

Optional depressurizing step 12a comprises, fluidly connecting an optional depressurization zone with at least one optional pressurization zone; forming a pressure equalization stream; recovering a pressure equalization stream from the optional depressurization zone, and reducing a pressure in optional depressurization zone to a pressure of less than the first pressure threshold. Prior to the end of adsorbing step 10 or the start of optional depressurizing step 12a, at least a portion of an adsorptive gas separator and optional depressurization zone, may be substantially sealed to reduce the leakage of gasses into the optional depressurization zone. At the start of optional depressurizing step 12a, a pressure of the optional depressurization zone may be greater than a pressure of the optional pressurization zone. As the optional depressurization zone is fluidly connected with the optional pressurization zone, at least a portion of the first component adsorbed on the at least one adsorbent material in the contactor within optional depressurization zone may desorb, forming the pressure equalization stream which may be enriched in the first component relative to the feed stream. A first end of the optional depressurization zone and first contactor may be fluidly connected to a first end of the optional pressurization zone and second contactor, but need not be.

Optional re-pressurizing step 12b comprises: fluidly connecting at least one optional pressurization zone with an optional depressurization zone; admitting at least a portion of a pressure equalization stream into at least one optional pressurization zone, and increasing a pressure of at least one optional pressurization zone to a pressure greater than the second pressure threshold. As at least a portion of a pressure equalization stream is admitted into at least one optional pressurization zone, at least a portion of the first component in the pressure equalization stream may adsorb on the at least one adsorbent material in the contactor. A first end of the optional depressurization zone and first contactor may be fluidly connected to a first end of the optional pressurization zone and second contactor, but need not be.

Optionally, during optional depressurizing step 12a, an optional depressurization zone may be fluidly connected to a plurality of optional pressurization zones, where each optional pressurization zone may be performing an optional pressurizing step 12b, simultaneously or sequentially, and/or at pressurizing the plurality of optional pressurization zones to different pressures. For example, an optional depressurization zone may be fluidly connected to a first optional pressurization zone and then a second optional pressurization zone in sequence, an optional depressurization zone may be fluidly connected to a first optional pressurization zone and a second optional pressurization zone at the same time, and/or an optional depressurization zone may be fluidly connected to increase the pressure of the first optional pressurization zone to a first pressure and then increase the pressure of a second optional pressurization zone to a second pressure, where the first pressure is greater than the second pressure. Optionally, a plurality of optional depressurizing step 12a in a plurality of optional depressurization zones and/or a plurality of optional pressurizing step 12b in a plurality of optional pressurization zones may be employed simultaneously or sequentially.

Optional pre-regenerating step 14a comprises, admitting a pre-regeneration stream into the adsorptive gas separation assembly, adsorptive gas separator, optional pre-regeneration zone, and optionally the second end the contactor, to flow in a direction optionally substantially towards the first end the contactor, at a pressure equal to or greater than a third pressure threshold (for example, less than the first pressure threshold, and equal to or greater than the second pressure threshold); desorbing a portion of the first component adsorbed on the at least one adsorbent material in the contactor within optional pre-regeneration zone; forming a reflux stream enriched in the first component relative to the feed stream, and recovering the reflux stream from the optional pre-regeneration zone and optionally from the adsorptive gas separator. The pre-regeneration stream may be a fluid stream (for example, a steam stream) at a temperature suitable to desorb a portion of at least the first component adsorbed on the at least one adsorbent material in the contactor. Optionally, the pre-regeneration stream may be at least a portion of the first and/or a second regeneration stream, and optionally at a pressure greater than the first and/or second regeneration stream.

Optional reflux step 14b comprises, admitting the reflux stream into optionally the adsorptive gas separator, optional reflux zone, and optionally the first end the contactor within optional reflux zone, optionally to flow in a direction substantially towards the second end of the contactor; adsorbing at least a portion of the first component in the reflux stream on the at least one adsorbent material in the contactor within optional reflux zone; forming a fourth product stream, and recovering the fourth product stream optionally from the second end of the contactor, optional reflux zone, and adsorptive gas separator. Optionally, the fourth product stream may be admitted into a condenser or condensing heat exchanger, (for example, the first condenser stage comprising at least one condenser or condensing heat exchanger employed for condensing step 18b and condensing the second product stream) to separate and recover the first and second components from the fourth product stream prior to recovering the fourth product stream from the adsorptive gas separation assembly. Prior to or about the start of reflux step 14b, the optional reflux zone may be at a pressure equal to or less than the third pressure threshold and equal to or greater than the second pressure threshold. During or about the termination of reflux step 14b, the pressure the optional reflux zone may increase to, for example, a pressure greater than the second pressure threshold and a pressure equal to or greater than the third pressure threshold.

Optionally, during pre-regenerating step 14a and reflux step 14b, optional pre-regeneration zone may be fluidly connected to optional reflux zone. Optional pre-regenerating step 14a and optional reflux step 14b may advantageously assist in increasing the purity of a second product stream recovered from the adsorptive gas separator.

Optional second regeneration step 16 comprises, admitting a second regeneration stream into the adsorptive gas separation assembly, adsorptive gas separator, optional second regeneration zone, and optionally the second end the contactor to flow in a direction substantially towards the first end the contactor; adsorbing at least a portion of a second component of the second regeneration stream on the at least one adsorbent material in the contactor; desorbing at least a portion of the first component adsorbed on the at least one adsorbent material in the contactor within the optional second regeneration zone; forming a fifth product stream at least periodically enriched in at least one of the first component and/or second component relative to the feed stream, and recovering the fifth product stream from the contactor, optional second regeneration zone, adsorptive gas separator and adsorptive gas separation assembly. A first portion of the fifth product stream may be enriched in the first component relative to the feed stream, may be recovered from optional second regeneration zone, optionally the adsorptive gas separator, and admitted into at least one of: an end use or end user of the fifth product stream optionally via a compressor; an optional third regeneration zone as a third regeneration stream via an optional heater or heat exchanger, and/or a condenser or condensing heat exchanger (for example, a condensing heat exchanger employed for condensing the second product stream during condensing step 18b). A second portion of the fifth product stream may be enriched in the second component relative to the feed stream, and may optionally be recovered from optional second regeneration zone, adsorptive gas separator, and admitted into a condenser or condensing heat exchanger (for example, a condensing heat exchanger employed for condensing the second product stream during condensing step 18b). The second regeneration stream may be a condensable gas stream comprising the second component (for example, $H_2O$ in the form of steam). Optionally, the second regeneration stream may be a portion of the first regeneration stream, at a pressure equal to or greater than a pressure of the first regeneration stream, at a pressure equal to or greater than the second pressure threshold, and/or at a pressure equal to or greater than the third pressure threshold. During optional second regenerating step 16, the optional second regeneration zone may be at a pressure lower that the first pressure threshold, equal to or greater than the second pressure threshold, and/or equal to or greater than the third pressure threshold.

Optional third regeneration step 20 comprises, admitting a third regeneration stream into the adsorptive gas separation assembly, adsorptive gas separator, optional third regeneration zone, and optionally the first end the contactor to flow in a direction substantially towards the second end of the contactor; desorbing at least a portion of the second component adsorbed on the at least one adsorbent material in the contactor within optional third regeneration zone; forming a sixth product stream enriched in at least one of the first or second component relative to the feed stream, and recovering the sixth product stream optionally from the second end of the contactor, optional third regeneration zone and adsorptive gas separator. The third regeneration stream may be a fluid stream enriched in the first component (for example, at least a portion of the second product stream, at least a portion of the purified second product stream, at least a portion of a fifth product stream) and may be admitted into a heater or heat exchanger to increase the temperature of the third regeneration stream to a temperature suitable for desorbing the second component from the at least one adsorbent material in the contactor within the optional third regeneration zone. A first portion of the sixth product stream recovered from the optional third regeneration zone may be enriched in the second component relative to the feed stream. A second portion of the sixth product stream recovered from the optional third regeneration zone may be enriched in the first component relative to the feed stream. A sixth product stream recovered from the adsorptive gas separator may be admitted into a condenser or condensing heat exchanger (for example, a condensing heat exchanger employed for condensing the second product stream during condensing step 18$b$) to recover at least a portion of the second component of the sixth product stream prior to recovering the sixth product stream from the adsorptive gas separation assembly. Optionally, the sixth product stream may be combined with the second product stream to form a portion of the second product stream and/or purified second product stream. During optional third regeneration step 18, optional third regeneration zone may be at a pressure equal to or less than a pressure of optional second regeneration zone during optional second regenerating step 16, but need not be.

FIG. 2$b$, illustrates an exemplary adsorptive gas separation process 5 according to an embodiment of the present disclosure, comprising substantially identical steps as adsorptive gas separation process 4 in FIG. 2$a$, however the sequence of steps in adsorptive gas separation process 5 are different from adsorptive gas separation process 4 in FIG. 2$a$. Adsorptive gas separation process 5, may be employed for separating at least a first component from a multi-component fluid mixture or stream comprising: adsorbing step 10, optional depressurizing step 12$a$, optional pre-regeneration step 14$a$, an optional second regenerating step 16, first regenerating step 18$a$, condensing step 18$b$, an optional third regeneration step 20, optional reflux step 14$b$, optional pressurizing step 12$b$, and conditioning step 24. Adsorbing step 10, optional depressurizing step 12$a$, optional pre-regeneration step 14$a$, optional second regenerating step 16, first regenerating step 18$a$, optional third regenerating step 20, optional reflux step 14$b$, optional pressurizing step 12$b$, and conditioning step 24 may be repeated cyclically in at least one adsorptive gas separator. Optionally, all steps in adsorptive gas separation process 5 may occur substantially simultaneously in an adsorptive gas separation assembly. Adsorptive gas separation process 5 may be suited for adsorptive gas separation applications where it is desirable to recover a product stream high in purity, reduce the formation of condensation during the adsorptive gas separation process, reduce energy consumption while operating at sub-ambient pressures, and/or reduce operating cost.

Referring to FIG. 3$a$, an exemplary adsorptive gas separation process 6 according to an embodiment of the present disclosure, may be employed for separating at least a first component from a multi-component fluid mixture or stream comprising: adsorbing step 10, optional depressurizing step 12$a$, optional pressurizing step 12$b$, optional pre-regeneration step 14$a$, optional reflux step 14$b$, optional second regenerating step 16, first regenerating step 18$a$, condensing step 18$b$, an optional fourth regenerating step 22, and conditioning step 24. Adsorbing step 10, optional depressurizing step 12$a$, optional pressurizing step 12$b$, optional pre-regeneration step 14$a$, optional reflux step 14$b$, optional second regenerating step 16, first regenerating step 18$a$, condensing step 18$b$, and condition step 24 are employed in adsorptive gas separation process 2 in FIG. 1 and/or adsorptive gas separation process 4 in FIG. 2$a$, and described in detail above. Adsorptive gas separation process 6 in FIG. 3$a$ differs from adsorptive gas separation process 4 in FIG. 2$a$, as adsorptive gas separation process 6 may optionally employ a fourth regenerating step as an alternative step to an optional third regenerating step which may be employed in adsorptive gas separation process 4. Furthermore, adsorptive gas separation process 6 may employ a vacuum pump for inducing a substantial portion of a pressure reduction or vacuum during an adsorptive gas separation process. Adsorbing step 10, optional depressurizing step 12$a$, optional pressurizing step 12$b$, optional pre-regeneration step 14$a$, optional reflux step 14$b$, optional second regenerating step 16, first regenerating step 18$a$, optional fourth regenerating step 22, and conditioning step 24, may be repeated cyclically in at least one adsorptive gas separator. Optionally, all steps in adsorptive gas separation process 6 may occur substantially simultaneously in an adsorptive gas separation assembly. Adsorptive gas separation process 6 may be suited for adsorptive gas separation applications where it is desirable to recover a product stream high in purity and reduce the formation of condensation during the adsorptive gas separation process resulting in reduced energy consumption, and/or operating cost.

Optionally, during condensing step 18$b$ of embodiment adsorptive gas separation process 6, at least one of a second product stream or a purified second product stream may be admitted into at least a first condensing stage comprising at least one vacuum pump to induce a pressure reduction or vacuum in the condenser or condensing heat exchanger, adsorptive gas separator, and first regeneration zone, to a pressure equal to or less than about the second pressure threshold. A purified second product stream may be recovered from the vacuum pump and first condenser stage and admitted into a compressor to increase the pressure of the purified second product stream to form a compressed second product stream. The at least one vacuum pump may be, for example, a liquid or water ring vacuum pump, but need not be.

Optional fourth regenerating step 22 comprises, admitting a fourth regeneration stream into the adsorptive gas separation assembly, adsorptive gas separator, optional fourth regeneration zone, and optionally the first end of the contactor to flow in a direction substantially towards the second end of the contactor; desorbing at least a portion of the first component adsorbed on the at least one adsorbent material in the contactor within optional fourth regeneration zone; forming a seventh product stream, and recovering the seventh product stream optionally from the second end the contactor, optional fourth regeneration zone, adsorptive gas separator and adsorptive gas separation assembly. The fourth regeneration stream may be, for example, an air stream, an inert gas stream, a post-combustion gas stream, a flue gas stream, or a first product stream, at a temperature, for example, equal to or greater than a condensation temperature of a second component in optional fourth regeneration zone, and may be admitted into a heater or heat exchanger to increase the temperature of the fourth regeneration stream prior to admitting into optional fourth regeneration zone. At least a portion of seventh product stream recovered from optional fourth regeneration zone, may periodically be admitted into at least one of: an adsorbing zone performing an adsorbing step via an optional heat exchanger to reduce a temperature of the seventh product stream, or an optional fuel combustor as a portion of an oxidant stream for the fuel combustor.

Figure 3B:
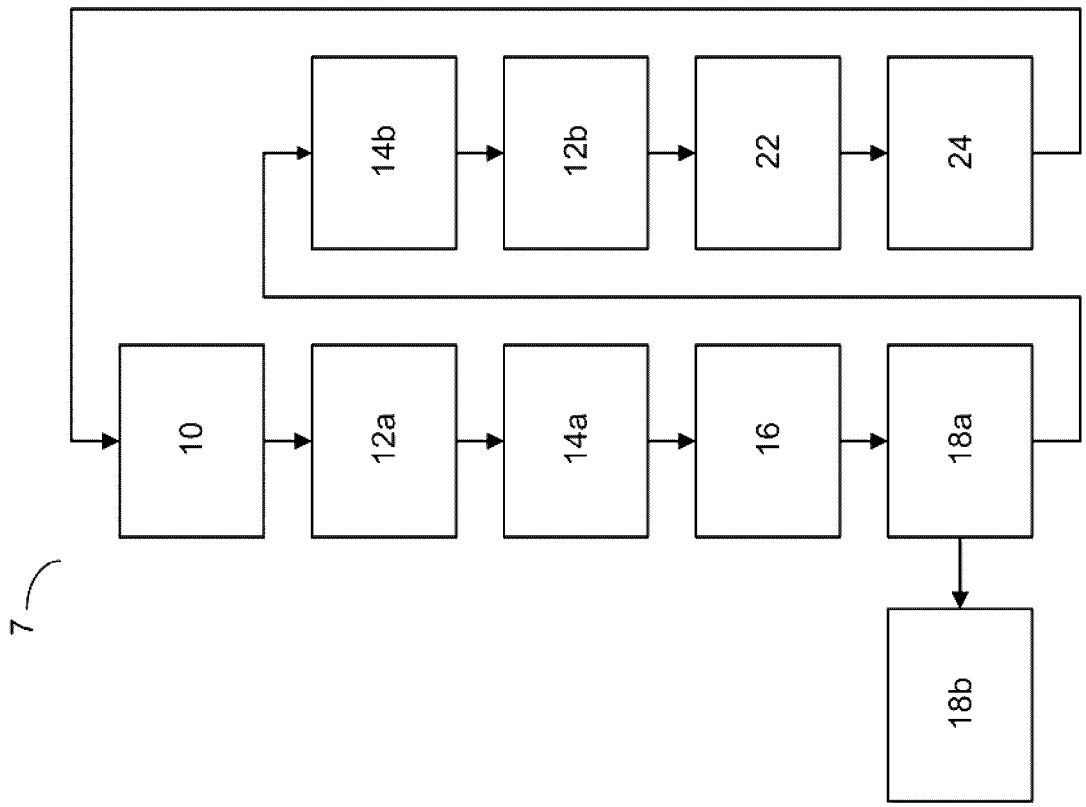
FIG. 3b is a flowchart illustrating an adsorptive gas separation process according to yet another embodiment of the present disclosure, where the process steps are in an alternative sequence to those of the adsorptive gas separation process in FIG. 3b.
Figure 3A:
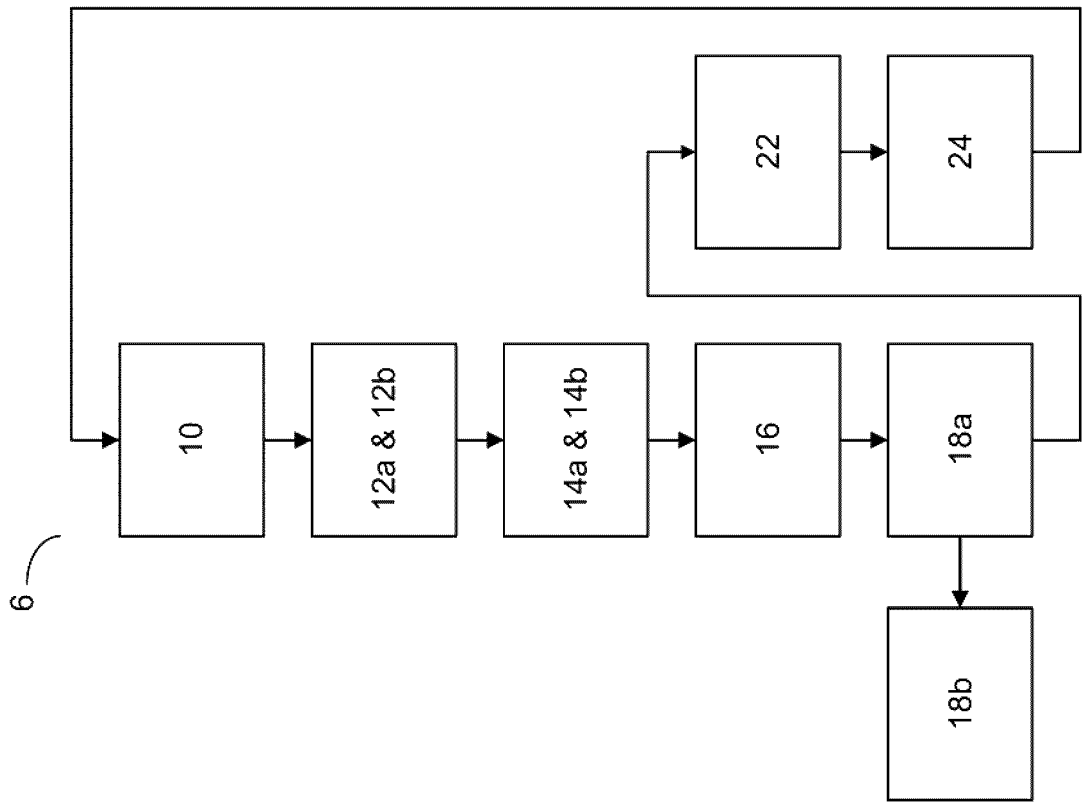
FIG. 3a is a flowchart illustrating an adsorptive gas separation process according to another embodiment of the present disclosure.

FIG. 3b illustrates an exemplary t adsorptive gas separation process 7 according to an embodiment of the present disclosure, comprising substantially identical steps as adsorptive gas separation process 6 in FIG. 3a, however the sequence of the steps in adsorptive gas separation process 7 are different from adsorptive gas separation process 6 in FIG. 3a. Adsorptive gas separation process 7, may be employed for separating at least a first component from a multi-component fluid mixture or stream, and comprises adsorbing step 10, optional depressurizing step 12a, optional pre-regeneration step 14a, an optional second regenerating step 16, first regenerating step 18a, condensing step 18b, optional reflux step 14b, optional pressurizing step 12b, optional fourth regenerating step 22, and conditioning step 24. Adsorbing step 10, optional depressurizing step 12a, optional pre-regeneration step 14a, an optional second regenerating step 16, first regenerating step 18a, optional reflux step 14b, optional pressurizing step 12b, optional fourth regenerating step 22, and conditioning step 24, may be repeated cyclically in at least one adsorptive gas separator. Optionally, all steps in adsorptive gas separation process 7 may occur simultaneously in a adsorptive gas separation assembly. Adsorptive gas separation process 7 may be suited for adsorptive gas separation applications where it is desirable to recover a product stream high in purity and reduce the formation of condensation during the adsorptive gas separation process resulting in reduced energy consumption, and/or operating cost.

Alternatively, an adsorptive gas separation process comprises, adsorbing step 10, first regenerating step 18, condensing step 18b, condition step 24, optionally any of the optional steps in any order (for example, optional depressurizing step 12a, optional pressurizing step 12b, optional pre-regeneration step 14a, optional reflux step 14b, optional second regenerating step 16, optional third regenerating step 20 and optional fourth regenerating step 22), and optionally with a plurality of depressurizing and/or pressurizing steps. For example, an embodiment adsorptive gas separation process may be employed for separating at least a first component from a multi-component fluid mixture or stream, comprising an adsorbing step 10, an optional depressurizing step 12a, an optional pressurizing step 12b, an optional pre-regeneration step 14a, an optional reflux step 14b, a first regenerating step 18a, condensing step 18b, an optional third regenerating step 20, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, an optional pre-regeneration step 14a, a first regenerating step 18a, condensing step 18b, an optional third regenerating step 20, an optional reflux step 14b, an optional pressurizing step 12b, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, an optional pressurizing step 12b, a first regenerating step 18a, condensing step 18b, an optional third regenerating step 20, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, a first regenerating step 18a, condensing step 18b, an optional third regenerating step 20, an optional pressurizing step 12b, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, an optional pressurizing step 12b, a first regenerating step 18a, condensing step 18b, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, a first regenerating step 18a, condensing step 18b, an optional pressurizing step 12b, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, an optional pressurizing step 12b, an optional pre-regeneration step 14a, an optional reflux step 14b, a first regenerating step 18a, condensing step 18b, an optional fourth regenerating step 22, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, an optional pre-regeneration step 14a, a first regenerating step 18a, condensing step 18b, an optional reflux step 14b, an optional pressurizing step 12b, an optional fourth regenerating step 22, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, an optional pressurizing step 12b, a first regenerating step 18a, condensing step 18b, an optional fourth regenerating step 22, and a conditioning step 24, which may be repeated sequentially and cyclically. For example, an embodiment adsorptive gas separation process may be employed for separating at least a first component from a multi-component fluid mixture or stream, comprising an adsorbing step 10, an optional depressurizing step 12a, a first regenerating step 18a, condensing step 18b, an optional pressurizing step 12b, an optional fourth regenerating step 22, and a conditioning step 24, which may be repeated sequentially and cyclically.

Figure 4:
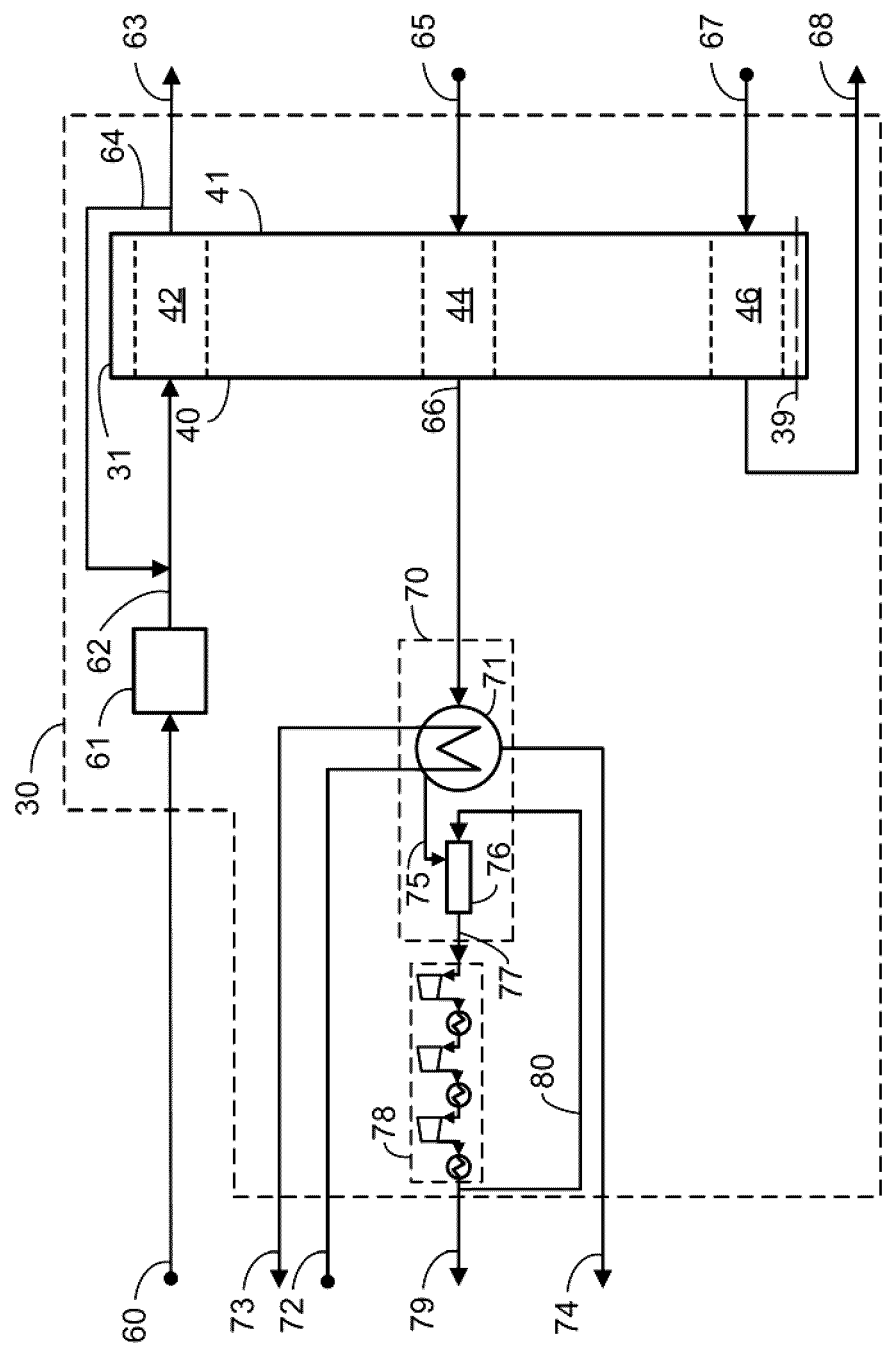
FIG. 4 is a schematic diagram of an adsorptive gas separation assembly according to a further embodiment of the present disclosure, which in one aspect may be employed with the exemplary adsorptive gas separation process in FIG. 1.

FIG. 4 is a schematic diagram illustrating an exemplary adsorptive gas separation assembly 30 according to an embodiment of the present disclosure, for adsorptive gas separation of at least a first component, for example, carbon dioxide, sulfur oxides, nitrogen oxides, from a multi-component fluid mixture or a multi-component fluid stream. Adsorptive gas separation assembly 30 comprises an optional heat exchanger, for example, a direct contact cooler (herein referred as "DCC"), or optional DCC 61, an exemplary adsorptive gas separator 31, a first condenser stage 70, and an optional compressor 78. Adsorptive gas separator 31 comprises, an enclosure (not shown in FIG. 4), for housing a contactor (not shown in FIG. 4) which cycles or moves through an adsorption zone 42, a first regeneration zone 44 and a conditioning zone 46. The contactor (not shown in FIG. 4) comprise at least one adsorbent material (not shown in FIG. 4) in and/or on optionally substantially parallel walls (not shown in FIG. 4), for example, substantially parallel to a longitudinal axis 39, which may assist in defining substantially parallel fluid passages (not shown in FIG. 4). Adsorptive gas separator 31, adsorption zone 42, first regeneration zone 44, conditioning zone 46 and contactor (not shown in FIG. 4) may have a first end 40 and a second end 41 which are axially opposed along longitudinal axis 39. Adsorption zone 42, first regeneration zone 44, conditioning zone 46 may be substantially sealed to reduce leakage of gasses between zones and from the ambient environment into adsorptive gas separator 31. First condenser stage 70, comprises a condenser, or specifically a condensing heat exchanger 71 and an optional ejector 76. Adsorptive gas separation assembly 30 may optionally comprise at least one additional condenser stage, for example, a second condenser stage in addition to first condenser stage 70, where each condenser stage may comprise at least one of: a vacuum pump, a condenser, a condensing heat exchanger, an ejector, and a check valve (all not shown in FIG. 4). Optional compressor 78 may be, for example, a single stage compressor with optional after cooling, or a multistage compressor with optional interstage cooling or intercoolers.

A feed stream source, for example, a multi-component fluid mixture source or a multi-component fluid stream source (all not shown in FIG. 4), may be fluidly connected to admit a multi-component fluid stream as a feed stream 60, into adsorptive gas separation assembly 30, optional DCC 61, where feed stream 60 may be recovered from optional DCC 61 as a feed stream 62. Optional DCC 61 may be fluidly connected to admit feed stream 62 into adsorptive gas separator 31 optionally via first end 40, adsorption zone 42, and at least a portion of a contactor (not shown in FIG. 4) in adsorption zone 42. Feed stream 62 may be at a pressure equal to or greater than a first pressure threshold, for example, about atmospheric pressure, or about 100 $kPa_{abs}$ when an adsorptive gas separation assembly is at an elevation of about sea level. Feed stream 62 may be at a temperature equal or less than a first temperature threshold (for example, about 50° C., or specifically about 40° C., or more specifically about 30° C.). As feed stream 60 contacts the at least one adsorbent material, at least a portion of a first component in feed stream 60 may adsorb onto the at least one adsorbent material (not shown in FIG. 4) on at least a portion of a contactor (not shown in FIG. 4) in adsorption zone 42, while the non-adsorbed components may form a first product stream 63. An ambient environment (not shown in FIG. 4) may be fluidly connected to recover first product stream 63 from adsorption zone 42, optionally via second end 41 of adsorptive gas separator 31 and adsorptive gas separation assembly 30.

In an assembly embodiment, a first regeneration stream source, for example, a steam source, (all not shown in FIG. 4) is fluidly connected to admit a first regeneration stream 65 comprising at least a condensable component or a second component (for example, $H_2O$ in the form of steam), into adsorptive gas separation assembly 30, optionally via second end 41 of adsorptive gas separator 31, first regeneration zone 44, and at least a portion of a contactor (not shown in FIG. 4) in first regeneration zone 44. First regeneration stream 65 may desorb at least a portion of the first component adsorbed on the at least one adsorbent material in at least a portion of a contactor (not shown in FIG. 4) in first regeneration zone 44, which along with at least a portion of first regeneration stream 65 may form a second product stream 66. First regeneration zone 44 optionally via first end 40 of adsorptive gas separator 31 may be fluidly connected to admit second product stream 66 into a hot circuit (not shown in FIG. 4) of condensing heat exchanger 71 of first condenser stage 70.

A coolant source (not shown in FIG. 4) may be fluidly connected to admit a coolant stream 72 into adsorptive gas separation assembly 30, first condenser stage 70 and a cool circuit (not shown in FIG. 4) of condensing heat exchanger 71. Coolant stream 72 may transfer and adsorb heat from hot circuit (not shown in FIG. 4) of condensing heat exchanger 71, forming a coolant stream 73. The coolant source (not shown in FIG. 4) may be fluidly connected to recover coolant stream 73 from the cool circuit (not shown in FIG. 4) of condensing heat exchanger 71, via first condenser stage 70, and adsorptive gas separation assembly 30, transferring and removing heat from the hot circuit (not shown in FIG. 4) of condensing heat exchanger 71. As heat is transferred away from the hot circuit (not shown in FIG. 4) of condensing heat exchanger 71, at least a portion of the second component in second product stream 66 may condense in the hot circuit (not shown in FIG. 4) of condensing heat exchanger 71, inducing a reduction in pressure or a vacuum in the hot circuit (not shown in FIG. 4) of condensing heat exchanger 71 and fluidly connected components, for example, first regeneration zone 44, at least a portion of a contactor (not shown in FIG. 4) in first regeneration zone 44, and at least a portion of adsorptive gas separator 31, to a pressure equal to or less than a second pressure threshold (for example, about 70 $kPa_{abs}$, or specifically about 50 $kPa_{abs}$, or more specifically about 30 $kPa_{abs}$, or most specifically about 20 $kPa_{abs}$). A condensate storage (not shown in FIG. 4) may be fluidly connected to recover a condensate stream 74 from a hot circuit (not shown in FIG. 4) of condensing heat exchanger 71, first condenser stage 70 and adsorptive gas separation assembly 30. The hot circuit (not shown in FIG. 4) of condensing heat exchanger 71 may be fluidly connected to admit a purified second product stream 75 into optional ejector 76 via a low pressure port (not shown in FIG. 4) of optional ejector 76. Optional compressor 78 may be fluidly connected to admit at least a portion of a compressed second product stream 79 as a motive fluid stream 80 into optional ejector 76 via a high pressure port (not shown in FIG. 4) of optional ejector 76. Motive fluid stream 80 may assist in inducing a reduction in pressure and/or assist in maintaining a reduction in pressure in optional ejector 76 and fluidly connected components, for example, hot circuit (not shown in FIG. 4) of condensing heat exchanger 71, first regeneration zone 44, at least a portion of a contactor (not shown in FIG. 4) in first regeneration zone 44, and at least a portion of adsorptive gas separator 31. Motive fluid stream 80 may mix with purified second product stream 75 in optional ejector 76, forming a mixed second product stream 76. Optional ejector 76 of first condenser stage 70 may be fluidly connected to admit mixed second product stream 76 into optional compressor 78, forming compressed second product stream 79. Optional compressor 78 of adsorptive gas separation assembly 30 may be fluidly connected to admit compressed second product stream 79 into an end use (not shown in FIG. 4) of compressed second product stream 79.

A conditioning stream source, for example, an ambient environment (not shown in FIG. 4), is fluidly connected to admit a conditioning stream 67, for example, an ambient air stream, into adsorptive gas separation assembly 30, optionally via second end 41 of adsorptive gas separator 31, conditioning zone 46, and at least a portion of a contactor (not shown in FIG. 4) in conditioning zone 46. Conditioning stream 67 may be at a pressure equal to or greater than a first pressure threshold, for example, about atmospheric pressure, and at a temperature equal or less than a first temperature threshold. Conditioning stream 67 may increase the pressure in conditioning zone 46 to a pressure equal to or greater than a first pressure threshold, reduce a temperature of the at least one adsorbent material (not shown in FIG. 4) on at least a portion of a contactor (not shown in FIG. 4) in conditioning zone 46 to a temperature equal or less than a first temperature threshold, and/or desorb at least one component adsorbed on the at least one adsorbent materials (not shown in FIG. 4) in conditioning zone 46. At least a portion of the desorbed components, and/or at least a portion of conditioning stream 67 in conditioning zone 46 may form a third product stream 68. Conditioning zone 46 of adsorptive gas separator 31 and adsorptive gas separation assembly 30, may be fluidly connected to admit third product stream 68 into an end use (not shown in FIG. 4) of third product stream 68.

Figure 5:
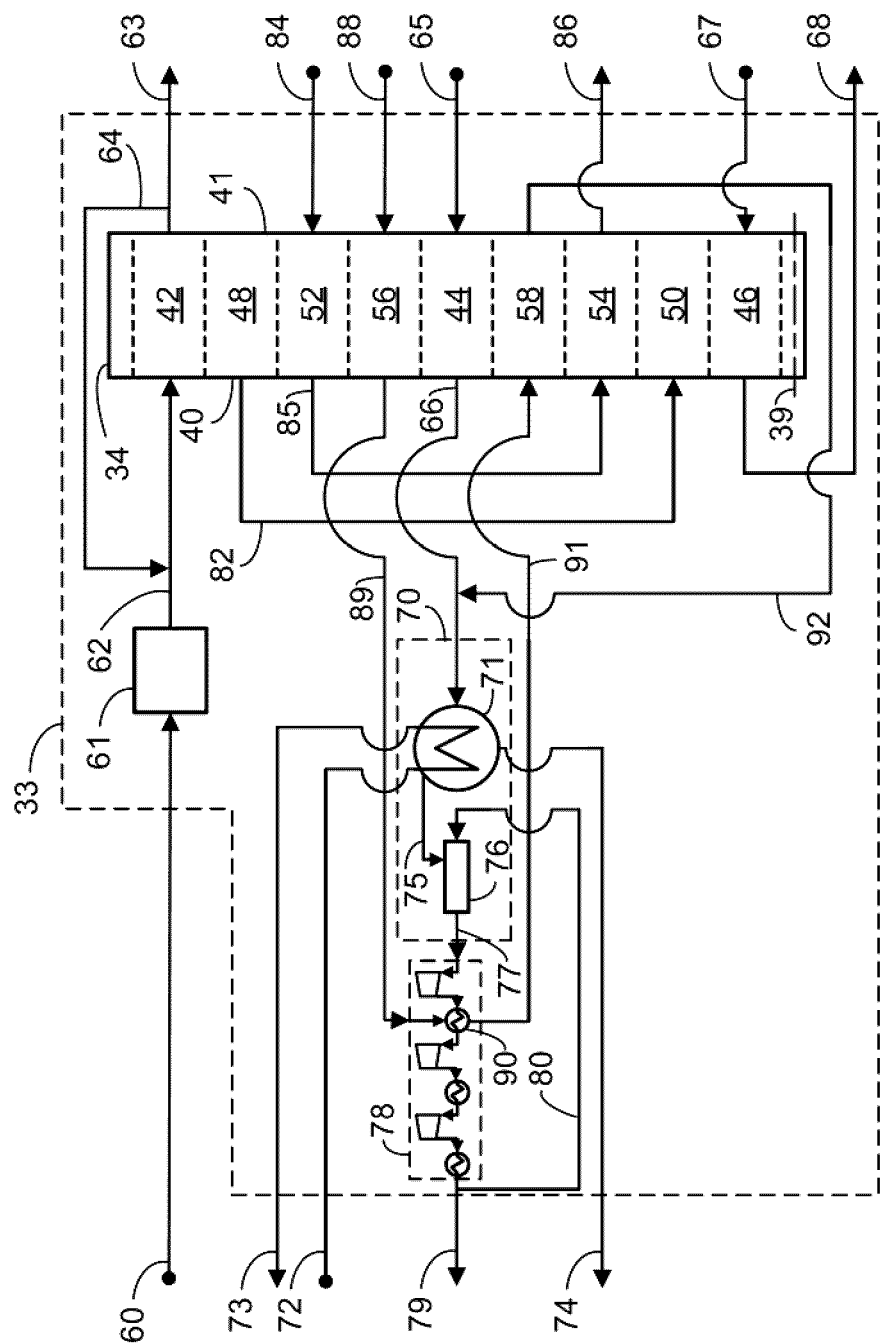
FIG. 5 is a schematic diagram of an adsorptive gas separation assembly according to yet a further embodiment of the present disclosure, which in one aspect may be employed with the exemplary adsorptive gas separation process in FIG. 2a or 2b.

FIG. 5 is a schematic diagram of an exemplary adsorptive gas separation assembly 33 according to an embodiment of the present disclosure, for adsorptive gas separation of at least a first component, for example, carbon dioxide, sulfur oxides, nitrogen oxides, from a multi-component fluid mixture or a multi-component fluid stream. Adsorptive gas separation assembly 33 comprises an optional heat exchanger, for example, a direct contact cooler or optional DCC 61, an exemplary adsorptive gas separator 34, a first condenser stage 70, and an optional compressor 78. Adsorptive gas separator 34 comprises, an enclosure (not shown in FIG. 5), for housing a contactor (not shown in FIG. 5) which cycles or moves through adsorption zone 42, an optional depressurization zone 48, an optional pre-regeneration zone 52, an optional second regeneration zone 56, first regeneration zone 44, an optional third regeneration zone 58, an optional reflux zone 54, an optional pressurization zone 50, and conditioning zone 46. The contactor (not shown in FIG. 5) comprise at least one adsorbent material (not shown in FIG. 5) in and/or on optionally substantially parallel walls (not shown in FIG. 5), for example, substantially parallel to a longitudinal axis 39, which may assist in defining substantially parallel fluid passages (not shown in FIG. 5). Adsorptive gas separator 34, adsorption zone 42, optional depressurization zone 48, optional pre-regeneration zone 52, optional second regeneration zone 56, first regeneration zone 44, optional third regeneration zone 58, optional reflux zone 54, optional pressurization zone 50, conditioning zone 46, and contactor (not shown in FIG. 5) may have a first end 40 and a second end 41 which are axially opposed along longitudinal axis 39, and may be substantially sealed to reduce leakage of gasses between zones and from the ambient environment into adsorptive gas separator 34. First condenser stage 70, comprises a condenser, or specifically a condensing heat exchanger 71 and an optional ejector 76. Adsorptive gas separation assembly 33 may optionally comprise at least one additional condenser stage, for example, a second condenser stage in addition to first condenser stage 70, where each condenser stage may comprise at least one of: a vacuum pump, a condenser, a condensing heat exchanger, an ejector, and a check valve (all not shown in FIG. 5). Optional compressor 78 may be, for example, a single stage compressor with optional after-cooling, or a multistage compressor with optional interstage cooling or intercoolers.

A feed stream source, for example, a multi-component fluid mixture source or a multi-component fluid stream source (all not shown in FIG. 5), may be fluidly connected to admit a multi-component fluid stream as a feed stream 60, into adsorptive gas separation assembly 33, optional DCC 61, where feed stream 60 may be recovered from optional DCC 61 as a feed stream 62. Optional DCC 61 may be fluidly connected to admit feed stream 62 into adsorptive gas separator 34 optionally via first end 40, adsorption zone 42, and at least a portion of a contactor (not shown in FIG. 5) in adsorption zone 42. Feed stream 62 may be at a pressure equal to or greater than a first pressure threshold, such as for example, about atmospheric pressure, or about 100 kPa$_{abs}$ when an adsorptive gas separation assembly is at an elevation of about sea level. At least a portion of a first component in feed stream 62 may adsorb onto the at least one adsorbent material (not shown in FIG. 5) on at least a portion of a contactor (not shown in FIG. 5) in adsorption zone 42 while non-adsorbed components may form a first product stream 63. Feed stream 62 may be at a temperature equal or less than a first temperature threshold (for example, about 50° C., or specifically about 40° C., or more specifically about 30° C.). An ambient environment (not shown in FIG. 5) may be fluidly connected to recover first product stream 63 from adsorption zone 42 optionally via second end 41 of adsorptive gas separator 34 and adsorptive gas separation assembly 33.

Optional depressurization zone 48 optionally via first end 40, may be fluidly connected to admit a pressure equalization stream 82 into optional pressurization zone 50 optionally via first end 40. Optionally, depressurization zone 48, may be fluidly connected to admit pressure equalization stream 82, into a plurality of optional pressurization zones (not shown in FIG. 5), optionally via first end 40. As pressure equalization stream 82 is recovered from depressurization zone 48 a pressure in depressurization zone 48 will decrease. As pressure equalization stream 82 is admitted into pressurization zone 50, a pressure in pressurization zone 50 will increase.

A pre-regeneration stream source, for example, a steam source (both not shown in FIG. 5), may be fluidly connected to admit a pre-regeneration stream 84, for example, a steam stream, into adsorptive gas separation assembly 33, adsorptive gas separator 34 optionally via second end 41, optional pre-regeneration zone 52, and at least a portion of a contactor (not shown in FIG. 5) in optional pre-regeneration zone 52. Pre-regeneration stream 84 may optionally be at a pressure equal to or greater than a third pressure threshold (for example, less than the first pressure threshold, and equal to or greater than the second pressure threshold). Pre-regeneration stream 84 may desorb at least a portion of the first component adsorbed on the at least on adsorbent material on at least a portion of a contactor (not shown in FIG. 5) in optional pre-regeneration zone 52, which along with at least a portion of pre-regeneration stream 84 may form a reflux stream 85. Optional pre-regeneration zone 52 may be fluidly connected to admit reflux stream 85 into optional reflux zone 54, optionally via first end 40, and at least a portion of a contactor (not shown in FIG. 5) in optional reflux zone 54. As reflux stream 85 contacts the at least on adsorbent material, at least a portion of the first component in pre-regeneration stream 84 may adsorb on the at least on adsorbent material on at least a portion of a contactor (not shown in FIG. 5) in optional reflux zone 54 while non-adsorbed components in pre-regeneration stream 84 may form a fourth product stream 86. Optional reflux zone 54 optionally via second end 41 of adsorptive gas separator 34, may be fluidly connected to admit fourth product stream 86 into an end use (not shown in FIG. 5) of fourth product stream 86, or optionally into a condenser, for example, condensing heat exchanger 71, to condense and recover condensable components, for example, water, from fourth product stream 86.

In an assembly embodiment, a second regeneration stream source, for example, a steam source, (both not shown in FIG. 5) is fluidly connected to admit a second regeneration stream 88, comprising at least a condensable component or a second component, for example, water, into adsorptive gas separation assembly 33, adsorptive gas separator 34 optionally via second end 41, optional second regeneration zone 56, and at least a portion of a contactor (not shown in FIG. 5) in optional second regeneration zone 56. Second regeneration stream 88 may desorb at least a portion of the first component adsorbed on the at least one adsorbent material in at least a portion of a contactor (not shown in FIG. 5) in optional second regeneration zone 56, which along with at least a portion of second regeneration stream 88 may form a fifth product stream 89. A first portion of fifth product stream 89 may be enriched in the first component relative to feed stream 62. Optional second regeneration zone 56 optionally via first end 40 of adsorptive gas separator 34 may be fluidly connected to admit at least a portion, for example, a first portion enriched in the first component relative to feed stream 62, of fifth product stream 89 into an intercooler 90 of optional compressor 78, which may increase a temperature of fifth product stream 89 to a temperature suitable for regeneration of the at least one adsorbent material, forming a third regeneration stream 91. Intercooler 90 of optional compressor 78 may be fluidly connected to admit third regeneration stream 91 into adsorptive gas separator 34 optionally via first end 40, optional third regeneration zone 58, and a portion of a contactor (not shown in FIG. 5) in optional third regeneration zone 58. Third regeneration stream 91 may desorb at least a portion of at least one component, for example, a second component, adsorbed on at least one adsorbent material in at least a portion of a contactor (not shown in FIG. 5) in optional third regeneration zone 58, which along with at least a portion of third regeneration stream 91 may form a sixth product stream 92. Optional third regeneration zone 58 optionally via second end 41 of adsorptive gas separator 34 may be fluidly connected to admit sixth product stream 92 into hot circuit (not shown in FIG. 5) of condensing heat exchanger 71 of first condenser stage 70. Optionally, optional second regeneration zone 56 optionally via second end 41 of adsorptive gas separator 34 may be fluidly connected to admit at least a portion, for example, a second portion enriched in the second component relative to feed stream 62, of fifth product stream 89 into hot circuit (not shown in FIG. 5) of condensing heat exchanger 71 of first condenser stage 70.

In an assembly embodiment, a first regeneration stream source, for example, a steam source, (both not shown in FIG. 5) may be fluidly connected to admit a first regeneration stream 65 comprising at least a condensable component or a second component, for example, water, into adsorptive gas separation assembly 33, adsorptive gas separator 34, first regeneration zone 44, and at least a portion of a contactor (not shown in FIG. 5) in first regeneration zone 44. First regeneration stream 65 may desorb at least a portion of the first component adsorbed on the at least one adsorbent materials in at least a portion of a contactor (not shown in FIG. 5) in first regeneration zone 44, which along with at least a portion of first regeneration stream 65 may form a second product stream 66. First regeneration zone 44 optionally via first end 40 of adsorptive gas separator 34, may be fluidly connected to admit second product stream 66 into hot circuit (not shown in FIG. 5) of condensing heat exchanger 71 of first condenser stage 70. A coolant source (not shown in FIG. 5) may be fluidly connected to admit a coolant stream 72 into adsorptive gas separation assembly 33, first condenser stage 70 and a cool circuit (not shown in FIG. 5) of condensing heat exchanger 71. Coolant stream 72 may transfer and adsorb heat from hot circuit (not shown in FIG. 5) of condensing heat exchanger 71, forming a coolant stream 73. The coolant source (not shown in FIG. 5) may be fluidly connected to recover coolant stream 73 from the cool circuit (not shown in FIG. 5) of condensing heat exchanger 71 of first condenser stage 70, and adsorptive gas separation assembly 33. As heat is transferred away from the hot circuit (not shown in FIG. 5) of condensing heat exchanger 71, at least a portion of the second component in second product stream 66 may condense in the hot circuit (not shown in FIG. 5) of condensing heat exchanger 71, inducing a reduction in pressure or a vacuum in the hot circuit (not shown in FIG. 5) of condensing heat exchanger 71 and fluidly connected components, for example, first regeneration zone 44, at least a portion of a contactor (not shown in FIG. 5) in first regeneration zone 44, and at least a portion of adsorptive gas separator 34, to a pressure equal to or less than a second pressure threshold (for example, about 70 $kPa_{abs}$, or specifically about 50 $kPa_{abs}$, or more specifically about 30 $kPa_{abs}$, or most specifically about 20 $kPa_{abs}$). A condensate storage (not shown in FIG. 5) may be fluidly connected to recover a condensate stream 74 from a hot circuit (not shown in FIG. 5) of condensing heat exchanger 71, first condenser stage 70 and adsorptive gas separation assembly 33. The hot circuit (not shown in FIG. 5) of condensing heat exchanger 71 may be fluidly connected to admit a purified second product stream 75 into a low pressure port (not shown in FIG. 5) of optional ejector 76. Optional compressor 78 may be fluidly connected to admit at least a portion of a compressed second product stream 79 as a motive fluid stream 80 into a high pressure port (not shown in FIG. 5) of optional ejector 76. Motive fluid stream 80 may assist in inducing a reduction in pressure and/or assist in maintaining a reduction in pressure in optional ejector 76 and fluidly connected components, for example, hot circuit (not shown in FIG. 5) of condensing heat exchanger 71, first regeneration zone 44, and at least a portion of a contactor (not shown in FIG. 5) in first regeneration zone 44. Motive fluid stream 80 may mix with purified second product stream 75 in optional ejector 76, forming a purified second product stream 77. Optional ejector 76 of first condenser stage 70 may be fluidly connected to admit purified second product stream 77 into optional compressor 78, forming compressed second product stream 79. Optional compressor 78 of adsorptive gas separation assembly 33 may be fluidly connected to admit compressed second product stream 79 into an end use (not shown in FIG. 5) for compressed second product stream 79.

A conditioning stream source, for example, an ambient environment (all not shown in FIG. 5), may be fluidly connected to admit a conditioning stream 67, for example, an ambient air stream at ambient pressure, into adsorptive gas separation assembly 33, adsorptive gas separator 34 optionally via second end 41, conditioning zone 46, and at least a portion of a contactor (not shown in FIG. 5) in conditioning zone 46. Conditioning stream 67 may be at a pressure equal to or greater than a first pressure threshold, for example, about atmospheric pressure and at a temperature equal or less than a first temperature threshold. Conditioning stream 67 may increase the pressure in conditioning zone 46 to a pressure equal to or greater than a first pressure threshold, reduce a temperature of the at least one adsorbent material (not shown in FIG. 5) on at least a portion of a contactor (not shown in FIG. 5) in conditioning zone 46 to a temperature equal or less than a first temperature threshold, and/or purge remnant components in conditioning zone 46. Purged components and/or at least a portion of conditioning stream 67 in conditioning zone 46 may form a third product stream 68. Conditioning zone 46 optionally via first end 40 of adsorptive gas separator 34, may be fluidly connected to admit third product stream 68 into an end use (not shown in FIG. 5) of third product stream 68.

Figure 6:
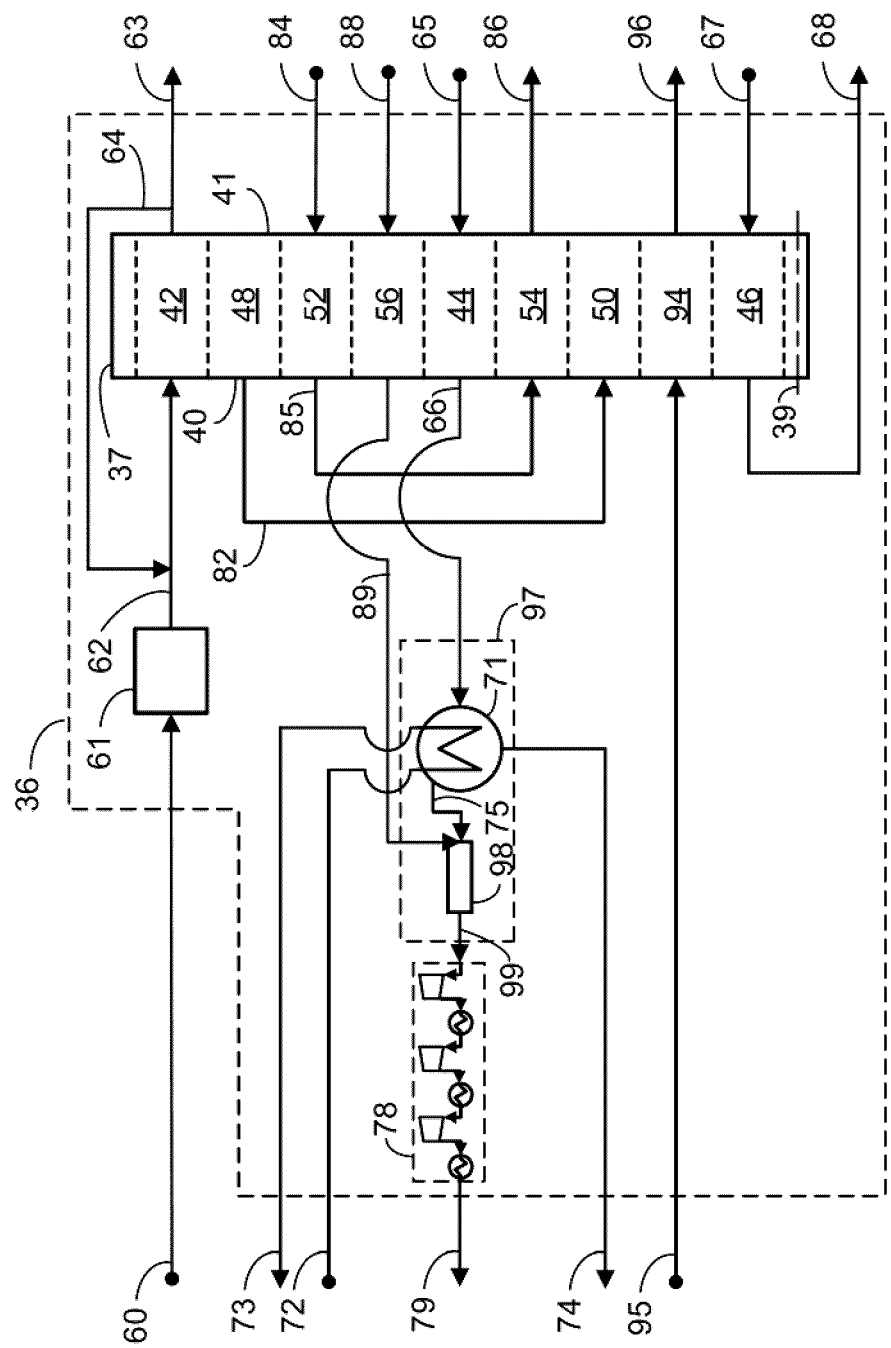
FIG. 6 is a schematic diagram of an adsorptive gas separation assembly according to an embodiment of the present disclosure, which in one aspect may be employed with the exemplary adsorptive gas separation process in FIG. 3a or 3b.

FIG. 6 is a schematic diagram of an exemplary adsorptive gas separation assembly 36 according to an embodiment of the present disclosure, for adsorptive gas separation of at least a first component, for example, carbon dioxide, sulfur oxides, or nitrogen oxides, from a multi-component fluid mixture or a multi-component fluid stream. Adsorptive gas separation assembly 36 comprises an optional heat exchanger, for example, a direct contact cooler or optional DCC 61, an exemplary adsorptive gas separator 37, a first condenser stage 97, and an optional compressor 78. Adsorptive gas separator 37 comprises, an enclosure (not shown in FIG. 6), for housing a contactor (not shown in FIG. 6) which cycles or moves through adsorption zone 42, an optional depressurization zone 48, an optional pre-regeneration zone 52, an optional second regeneration zone 56, first regeneration zone 44, an optional reflux zone 54, an optional pressurization zone 50, an optional fourth regeneration zone 94, and conditioning zone 46. The contactor (not shown in FIG. 6) comprise at least one adsorbent material (not shown in FIG. 6) in and/or on optionally substantially parallel walls (not shown in FIG. 6), for example, substantially parallel to a longitudinal axis 39, which may assist in defining substantially parallel fluid passages (not shown in FIG. 6). Adsorptive gas separator 37, adsorption zone 42, optional depressurization zone 48, optional pre-regeneration zone 52, optional second regeneration zone 56, first regeneration zone 44, optional reflux zone 54, optional pressurization zone 50, optional fourth regeneration zone 94, conditioning zone 46, and contactor (not shown in FIG. 6) may have a first end 40 and a second end 41 which are axially opposed along longitudinal axis 39, and may be substantially sealed to reduce leakage of gasses between zones and from the ambient environment into adsorptive gas separator 37. First condenser stage 97, comprises a vacuum pump 98, for example, a liquid ring vacuum pump, and optionally a condenser, or specifically a condensing heat exchanger 71. Adsorptive gas separation assembly 36 may optionally comprise at least one additional condenser stage, for example, a second condenser stage in addition to first condenser stage 97, where each condenser stage may comprise at least one of: a vacuum pump, a condenser, a condensing heat exchanger, an ejector, and a check valve (all not shown in FIG. 6). Optional compressor 78 may be, for example, a single stage compressor with optional after cooling, or a multistage compressor with optional interstage cooling or intercoolers.

A feed stream source, for example, a multi-component fluid mixture source or a multi-component fluid stream source (all not shown in FIG. 6), is fluidly connected to admit a multi-component fluid stream as a feed stream 60, into adsorptive gas separation assembly 36, optional DCC 61, where feed stream 60 may be recovered from optional DCC 61 as a feed stream 62. Optional DCC 61 may be fluidly connected to admit feed stream 62 into adsorptive gas separator 37 optionally via first end 40, adsorption zone 42, and at least a portion of a contactor (not shown in FIG. 6) in adsorption zone 42. Feed stream 62 may be at a pressure equal to or greater than a first pressure threshold, for example, about atmospheric pressure, or about 100 kPa$_{abs}$ when an adsorptive gas separation assembly is at an elevation of about sea level. At least a portion of at least a first component in feed stream 62 may adsorb onto the at least one adsorbent material (not shown in FIG. 6) on at least a portion of a contactor (not shown in FIG. 6) in adsorption zone 42 while non-adsorbed components may form a first product stream 63. Feed stream 62 may be at a temperature equal or less than a first temperature threshold (for example, about 50° C., or specifically about 40° C., or more specifically about 30° C.). An ambient environment (not shown in FIG. 6) may be fluidly connected to recover first product stream 63 from adsorption zone 42, optionally via second end 41 of adsorptive gas separator 37 and adsorptive gas separation assembly 36.

Optional depressurization zone 48 optionally via first end 40, may be fluidly connected to admit a pressure equalization stream 82 into optional pressurization zone 50 optionally via first end 40. Optionally, depressurization zone 48, may be fluidly connected to admit pressure equalization stream 82, into a plurality of optional pressurization zones (not shown in FIG. 6), optionally via first end 40. As pressure equalization stream 82 is recovered from depressurization zone 48 a pressure in depressurization zone 48 will decrease. As pressure equalization stream 82 is admitted into pressurization zone 50, a pressure in pressurization zone 50 will increase.

A pre-regeneration stream source, for example, a steam source (both not shown in FIG. 6) may be fluidly connected to admit a pre-regeneration stream 84, for example, a steam stream, into adsorptive gas separation assembly 36, adsorptive gas separator 37 optionally via second end 41, optional pre-regeneration zone 52, and at least a portion of a contactor (not shown in FIG. 6) in optional pre-regeneration zone 52. Pre-regeneration stream 84 may optionally be at a pressure equal to or greater than a third pressure threshold (for example, less than the first pressure threshold, and equal to or greater than the second pressure threshold). Pre-regeneration stream 84 may desorb at least a portion of the first component adsorbed on the at least on adsorbent material on at least a portion of a contactor (not shown in FIG. 6) in optional pre-regeneration zone 52, which along with at least a portion of pre-regeneration stream 84 may form a reflux stream 85. Optional pre-regeneration zone 52 may be fluidly connected to admit reflux stream 85 into optional reflux zone 54, optionally via first end 40, and at least a portion of a contactor (not shown in FIG. 6) in optional reflux zone 54. As reflux stream 85 contacts the at least on adsorbent material, at least a portion of the first component in pre-regeneration stream 84 may adsorb on the at least on adsorbent material on at least a portion of a contactor (not shown in FIG. 6) in optional reflux zone 54 while non-adsorbed components in pre-regeneration stream 84 may form a fourth product stream 86. Optional reflux zone 54 optionally via second end 41 of adsorptive gas separator 37, may be fluidly connected to admit fourth product stream 86 into an end use (not shown in FIG. 6) of fourth product stream 86, or optionally into a condenser, for example, condensing heat exchanger 71, to condense and recover condensable components, for example, water, from fourth product stream 86.

In an assembly embodiment, a second regeneration stream source, for example, a steam source, (both not shown in FIG. 6) is fluidly connected to admit a second regeneration stream 88, comprising at least a condensable component or a second component, for example, water, into adsorptive gas separation assembly 36, adsorptive gas separator 37, optional second regeneration zone 56, and at least a portion of a contactor (not shown in FIG. 6) in optional second regeneration zone 56. Second regeneration stream 88 may desorb at least a portion of the first component adsorbed on the at least one adsorbent material in at least a portion of a contactor (not shown in FIG. 6) in optional second regeneration zone 56, which along with at least a portion of second regeneration stream 88 may form a fifth product stream 89. A first portion of fifth product stream 89 may be enriched in the first component relative to feed stream 62. Optional second regeneration zone 56 optionally via first end 40 of adsorptive gas separator 37 may be fluidly connected to admit at least a portion, for example, a first portion enriched in the first component relative to feed stream 62, of fifth product stream 89 into at least one of: vacuum pump 98, optionally into compressor 78 and/or hot circuit (not shown in FIG. 6) of condensing heat exchanger 71 of first condenser stage 97. Optionally, second regeneration zone 56 optionally via first end 40 of adsorptive gas separator 37 may be fluidly connected to admit at least a portion, for example, a second portion enriched in the second component relative to feed stream 62, of fifth product stream 89 into first condenser stage 97 and hot circuit (not shown in FIG. 6) of condensing heat exchanger 71.

In an assembly embodiment, a first regeneration stream source, for example, a steam source, (both not shown in FIG. 6) is fluidly connected to admit a first regeneration stream 65 comprising at least a condensable component or a second component, for example, water, into adsorptive gas separation assembly 36, adsorptive gas separator 37, first regeneration zone 44, and at least a portion of a contactor (not shown in FIG. 6) in first regeneration zone 44. First regeneration stream 65 may desorb at least a portion of the first component adsorbed on the at least one adsorbent materials in at least a portion of a contactor (not shown in FIG. 6) in first regeneration zone 44, which along with at least a portion of first regeneration stream 65 may form a second product stream 66. First regeneration zone 44 optionally via first end 40 of adsorptive gas separator 37, may be fluidly connected to admit second product stream 66 into hot circuit (not shown in FIG. 6) of condensing heat exchanger 71 of first condenser stage 97. A coolant source (not shown in FIG. 6) may be fluidly connected to admit a coolant stream 72 into adsorptive gas separation assembly 36, first condenser stage 97 and a cool circuit (not shown in FIG. 6) of condensing heat exchanger 71. Coolant stream 72 may transfer and adsorb heat from hot circuit (not shown in FIG. 6) of condensing heat exchanger 71, forming a coolant stream 73. The coolant source (not shown in FIG. 6) may be fluidly connected to recover coolant stream 73 from the cool circuit (not shown in FIG. 6) of condensing heat exchanger 71, first condenser stage 97, and adsorptive gas separation assembly 36. As heat is transferred away from the hot circuit (not shown in FIG. 6) of condensing heat exchanger 71, at least a portion of the second component in second product stream 66 may condense in the hot circuit (not shown in FIG. 6) of condensing heat exchanger 71. A condensate storage (not shown in FIG. 6) may be fluidly connected to recover a condensate stream 74 from a hot circuit (not shown in FIG. 6) of condensing heat exchanger 71, first condenser stage 97 and adsorptive gas separation assembly 36. Vacuum pump 98 may be fluidly connected to recover a purified second product stream 75 from the hot circuit (not shown in FIG. 6) of condensing heat exchanger 71. Vacuum pump 98 which may induce a reduction in pressure or a vacuum in the hot circuit (not shown in FIG. 6) of condensing heat exchanger 71 and fluidly connected components, for example, first regeneration zone 44, at least a portion of a contactor (not shown in FIG. 6) in first regeneration zone 44, and at least a portion of adsorptive gas separator 37, to a pressure equal to or less than a second pressure threshold (for example, about 70 $kPa_{abs}$, or specifically about 50 $kPa_{abs}$, or more specifically about 30 $kPa_{abs}$, or most specifically about 20 $kPa_{abs}$). Vacuum pump 98 may be fluidly connected to admit a purified second product stream 99 into optional compressor 78 forming compressed second product stream 79. Optional compressor 78 and adsorptive gas separation assembly 36 may be fluidly connected to admit compressed second product stream 79 into an end use (not shown in FIG. 6) for compressed second product stream 79.

In an assembly embodiment, a fourth regeneration stream source via, for example, a heat exchanger, a heater for heating a gas stream, a fuel combustor (all not shown in FIG. 6) may be fluidly connected to admit a fourth regeneration stream 95, for example, an air stream (not shown in FIG. 6), an inert gas stream (not shown in FIG. 6), a post-combustion gas stream (not shown in FIG. 6), or a first product stream 63, at a temperature equal to or greater than a condensation temperature of a second component in fourth regeneration zone 94, into adsorptive gas separation assembly 36, adsorptive gas separator 37 optionally via first end 40, fourth regeneration zone 94, and at least a portion of a contactor (not shown in FIG. 6) in fourth regeneration zone 94. Fourth regeneration stream 95 may desorb at least a portion of the second component adsorbed on the at least one adsorbent materials in at least a portion of a contactor (not shown in FIG. 6) in fourth regeneration zone 94, which along with at least a portion of fourth regeneration stream 95 may form a seventh product stream 96. Fourth regeneration zone 94 optionally via first end 40 of adsorptive gas separator 37, may be fluidly connected to admit seventh product stream 96 into an end use (not shown in FIG. 6) of seventh product stream 96.

A conditioning stream source, for example, an ambient environment (not shown in FIG. 6), is fluidly connected to admit a conditioning stream 67, for example, an ambient air stream at ambient pressure, into adsorptive gas separation assembly 36, adsorptive gas separator 37, optionally via second end 41, conditioning zone 46, and at least a portion of a contactor (not shown in FIG. 6) in conditioning zone 46. Conditioning stream 67 may be at a pressure equal to or greater than a first pressure threshold, for example, about atmospheric pressure and at a temperature equal or less than a first temperature threshold. Conditioning stream 67 may increase the pressure in conditioning zone 46 to a pressure equal to or greater than a first pressure threshold, reduce a temperature of the at least one adsorbent material (not shown in FIG. 6) on at least a portion of a contactor (not shown in FIG. 6) in conditioning zone 46 to a temperature equal or less than a first temperature threshold, and/or purge remnant components in conditioning zone 46. Purged components and/or at least a portion of conditioning stream 67 in conditioning zone 46 may form a third product stream 68. Conditioning zone 46 optionally via first end 40 of adsorptive gas separator 37, may be fluidly connected to admit third product stream 68 into a third product stream end use (not shown in FIG. 6).

Referring to FIGS. 4, 5, and 6, in alternative embodiments, adsorptive gas separation assembly 30, adsorptive gas separation assembly 33, and adsorptive gas separation assembly 36, may comprise: a plurality of adsorptive gas separators further comprising at least one contactor where the plurality of adsorptive gas separators are configured to move or cycle through a plurality of stationary zones, or at least one adsorptive gas separator further comprising at least one contactor where the at least one adsorptive gas separator and at least one contactor are configured to be stationary and a plurality of zones move or cycle through the at least one contactor.

In another process embodiment, an integrated adsorptive gas separation process is provided for separating at least a first component, for example, carbon dioxide, sulfur oxides, nitrogen oxides, from a multi-component fluid mixture or stream, for example, a flue gas stream or a post-combustion gas stream produced by a fuel combustor, in an adsorptive gas separation system. The integrated adsorptive gas separation process may be particularly suitable for, for example, separation of carbon dioxide from a post-combustion gas stream of a fuel combustor in a combined cycle power plant.

In one embodiment, an integrated adsorptive gas separation process comprises a combustion process, a steam process, and an embodiment adsorptive gas separation process described herein, for separating at least a first component (for example, carbon dioxide, sulfur oxides, or nitrogen oxides,) from a multi-component fluid mixture or stream (for example, a flue gas stream or a post-combustion gas stream produced by a fuel combustor). A fuel combustor may comprise any suitable type of fuel combustion device such as but not limited to gaseous fuel, liquid fuel and/or solid fuel combustors. In a particular embodiment, the fuel combustor may comprise at least one of: a gas turbine combustor, combined cycle gas turbine combustor, liquid-fuel (such as oil/kerosene/diesel/gasoline and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example. In one embodiment, a steam process may be employed to produce at least one high pressure steam stream in a steam generator which may comprise at least one of: a heat exchanger, a boiler, a heat recovery steam generator (herein referred as "HRSG"), for example. The steam process may further comprise expanding the high pressure steam stream into at least one steam stream which may be admitted and employed as at least one regeneration stream for an embodiment adsorptive gas separation process.

In an integrated adsorptive gas separation process embodiment, a fuel stream and an oxidant stream is combusted in a fuel combustor to produce at least a flue gas stream or a post-combustion gas stream comprising at least a first component, where at least a portion of the post-combustion gas stream may be recovered from the fuel combustor and employed as a feed stream or optionally a fourth regeneration stream for an embodiment adsorptive gas separation process, and an embodiment adsorptive gas separation assembly. At least a portion of the post-combustion gas stream may also be employed as a source or supply of heat for a steam process described herein. A combustion process comprises: admitting a fuel stream into a fuel combustor; admitting an oxidant stream into an integrated adsorptive gas separation system and the fuel combustor; mixing the fuel stream and oxidant stream forming a mixed oxidant and fuel stream; combusting the mixed oxidant and fuel stream; producing a post-combustion gas mixture or a post-combustion gas stream comprising at least the first component, and recovering the post-combustion gas stream from the fuel combustor. Optionally, a post-combustion gas stream may be recovered from a fuel combustor and admitted into at least one post-combustion emission abatement device (for example, a particulate collector, a flue gas desulfurizer) to reduce the levels of particulates and/or sulfur oxides prior to admitting the post-combustion gas stream as a feed stream and/or a fourth regeneration stream into an embodiment adsorptive gas separation process, and an embodiment adsorptive gas separation assembly. Also optionally, a post-combustion gas stream may be recovered from a fuel combustor or at least one post-combustion emission abatement device and admitted into at least one a heat exchange device (for example, a direct contact cooler, a gas-to-gas heat exchanger, a gas-to-liquid heat exchanger) to reduce a temperature of the post-combustion gas stream to a temperature (for example, equal to or less than a first temperature threshold) prior to admitting the post-combustion gas stream as a feed stream and/or a fourth regeneration stream into an embodiment adsorptive gas separation process, and an embodiment adsorptive gas separation assembly. Optionally, a third product stream formed and recovered during a conditioning step, and/or a seventh product stream formed and recovered during a fourth regenerating step of an adsorptive gas separation process may be admitted to form at least a portion of an oxidant stream admitted into a fuel combustor, for combustion with a fuel stream, which may advantageously increase the concentration of the first component in the post-combustion gas stream.

In an integrated adsorptive gas separation process embodiment, a steam process may form at least one steam stream for employment as at least one of a regeneration stream and/or a pre-regeneration stream for an embodiment adsorptive gas separation process. An exemplary steam process comprises: admitting at least a portion of the post-combustion gas stream recovered from a fuel combustor into a steam subsystem, and at least one steam generator (for example, a heat exchanger, a boiler, a heat recovery steam generator); admitting a feed water stream comprising at least a water and/or a condensate stream into optionally an integrated adsorptive gas separation system, a steam subsystem, and the at least one steam generator; transferring heat from the at least a portion of post-combustion gas stream to the steam generator and feed water stream; converting the feed water stream into a high pressure steam stream; recovering the at least a portion of post-combustion gas stream from the at least one steam generator, and recovering the high pressure steam stream from the at least one steam generator. The feed water stream, water stream, condensate stream and high pressure steam stream may comprise at least a second component, for example, water. The high pressure steam stream may be at a pressure of, for example, equal to or greater than about 1,000 $kPa_{abs}$, or specifically equal to or greater than about 2,000 $kPa_{abs}$, or more specifically equal to or greater than about 3,000 $kPa_{abs}$.

In an integrated adsorptive gas separation process embodiment, the steam process comprises: admitting at least one high pressure steam stream recovered from at least one steam generator as a feed stream into at least a first steam turbine (for example, a high pressure steam turbine); expanding the at least one high pressure steam stream in the first steam turbine to form at least one of, at least one intermediate pressure steam stream, at least one low pressure steam stream, at least one very low pressure steam stream, and/or at least one ultra-low pressure steam stream, and recovering at least one of, at least one intermediate pressure steam stream, at least one low pressure steam stream, at least one very low pressure steam stream, and/or at least one ultra-low pressure steam stream from the first steam turbine.

A first steam turbine may comprise a single stage steam turbine or a multistage steam turbine further comprising, for example, a high pressure stage, an optional intermediate pressure stage, a low pressure stage, an optional very low pressure stage and an optional ultra-low pressure stage. A low pressure steam stream may be at a pressure of, for example, equal to or less than 600 $kPa_{abs}$, or specifically equal to or less than 400 $kPa_{abs}$, or more specifically equal to or less than 200 $kPa_{abs}$. A very low pressure steam stream may be at a pressure of, for example, equal to or less than 300 $kPa_{abs}$, or specifically equal to or less than 200 $kPa_{abs}$, or more specifically equal to or less than 100 $kPa_{abs}$, or most specifically equal to or less than 70 $kPa_{abs}$. An ultra-low pressure steam stream may be at a pressure of, for example, equal to or less than 110 $kPa_{abs}$, or specifically equal to or less than 70 $kPa_{abs}$, or more specifically equal to or less than 50 $kPa_{abs}$, or most specifically equal to or less than 30 $kPa_{abs}$. Optionally, the steam process further comprises expanding the high pressure steam stream in a first steam turbine, and powering at least one mechanical equipment (for example, an electric generator, to produce electric power) mechanically coupled to the first steam turbine.

A feed stream of a steam turbine may be admitted and expanded to a plurality of pressures within a stage (for example, a high pressure stage, an intermediate pressure stage, a low pressure stage, a very low pressure stage, and an ultra-low pressure stage) of a steam turbine. A plurality of steam streams may be recovered from a stage of a steam turbine having a plurality of pressures. For example, a feed stream may be admitted and expanded in a steam turbine where a first steam stream may be recovered from an ultra-low pressure stage of the steam turbine at a first pressure, and a second steam stream may be recovered from the ultra-low pressure stage of the steam turbine at a second pressure, and the first pressure is greater than or less than the second pressure.

In an integrated adsorptive gas separation process embodiment, at least one steam stream may be recovered between stages of multistage steam turbine and/or within a stage of a steam turbine at a pressure below the first pressure threshold, and admitted as at least one of a pre-regeneration stream, a first regeneration stream, and/or a second regeneration stream for an embodiment adsorptive gas separation process and optionally employed as a feed stream for one or more steam turbines, for example, a second steam turbine. A plurality of steam streams may be recovered within a stage of a steam turbine having a plurality of pressures below the first pressure threshold and admitted as at least one of a pre-regeneration stream, a first regeneration stream, and/or a second regeneration stream for an embodiment adsorptive gas separation process and optionally employed as a feed stream for one or more steam turbines, for example, a second steam turbine.

In an integrated adsorptive gas separation process embodiment, the steam process optionally comprises: admitting at least a portion of at least one low pressure steam stream recovered from the first steam turbine as a feed stream into a second steam turbine (for example, a low pressure steam turbine); expanding the feed stream or low pressure steam stream in the second steam turbine to form at least one very low pressure steam stream, and recovering at least one very low pressure steam stream from the second steam turbine. Optionally, the steam process further comprises expanding the feed stream or at least one low pressure steam stream in the second steam turbine, and powering at least one mechanical equipment (for example, an electric generator, to produce electric power) mechanically coupled to the second steam turbine, which may advantageously utilize energy in the feed stream or low pressure steam stream which may otherwise be exhausted resulting in offsetting the operating cost of an adsorptive gas separation process while forming at least one pre-regeneration stream and/or regeneration stream for an embodiment adsorptive gas separation process. Optionally, the steam process further comprises expanding the feed stream or at least one low pressure steam stream in the second steam turbine; forming a plurality of very low pressure steam streams, and recovering the plurality of very low pressure steam streams from the second steam turbine. Optionally, a plurality of very low pressure steam streams recovered from the second steam turbine may be at pressures which are different.

In an integrated adsorptive gas separation process embodiment, at least a portion of at least one steam stream (for example, a very low pressure steam stream) may be recovered from a second steam turbine (for example, a low pressure steam turbine), employed and admitted as at least one pre-regeneration stream and/or regeneration stream for an embodiment adsorptive gas separation process (for example, at least one of a pre-regeneration stream, a first regeneration stream, and/or a second regeneration stream for an embodiment adsorptive gas separation process). Optionally, a plurality of at least one of a very low pressure steam stream and/or an ultra-low pressure steam stream, may be recovered optionally at pressures which are different from a second steam turbine, employed and admitted as at least one pre-regeneration stream and/or regeneration stream for an embodiment adsorptive gas separation process and optionally employed and admitted as a feed stream for one or more steam turbines, for example, a third steam turbine.

In an integrated adsorptive gas separation process embodiment, optionally the steam process comprises: admitting at least a portion of at least one very low pressure steam stream recovered from a second steam turbine as a feed stream into a third steam turbine (for example, a very low pressure steam turbine); expanding the feed stream or very low pressure steam stream in the third steam turbine to form at least one ultra-low pressure steam stream, and recovering at least one ultra-low pressure steam stream from the third steam turbine. Optionally, the steam process further comprises expanding the feed stream or at least one very low pressure steam stream in a third steam turbine, and powering at least one mechanical equipment (for example, an electric generator, to produce electric power) mechanically coupled to the third steam turbine, which may advantageously utilize energy in the very low pressure steam stream which may otherwise be exhausted further resulting in offsetting the operating cost of an adsorptive gas separation process. Optionally, the at least one very low pressure steam stream may be expanded in the third steam turbine to form a plurality of ultra-low pressure steam streams, and recovering the plurality of ultra-low pressure steam streams from the third steam turbine where the plurality of steam streams expanded by and recovered from the third steam turbine are at pressures which are different.

In an integrated adsorptive gas separation process embodiment, at least a portion of at least one steam stream (for example, an ultra-low pressure steam stream) may be recovered from a third steam turbine (for example, a very low pressure steam turbine), employed and admitted as at least one pre-regeneration stream and/or regeneration stream for an embodiment adsorptive gas separation process (for example, at least one of a pre-regeneration stream, a first regeneration stream, and/or a second regeneration stream for an embodiment adsorptive gas separation process).

A term steam-to-regeneration stream ratio refers to a total quantity or mass of all steam streams admitted and employed as at least one regeneration stream (for example, a pre-regeneration stream, a first regeneration stream, and/or a second regeneration stream) for a adsorptive gas separation process to a total quantity or mass of all steam steams admitted and employed for expansion in at least one first steam turbine in which the at least one regeneration stream may originate, and may be expressed as a percentage. A steam-to-regeneration stream ratio may be calculated as illustrated in equation (1).

$$r = (m_2 \div m_1) \times 100 \tag{1}$$

where:

r=steam-to-regeneration stream ratio, $m_2$=total mass of all steam streams admitted as at least one regeneration stream for a adsorptive gas separation process, $m_1$=total mass of all steam streams admitted in at least one first steam turbine in which the at least one regeneration stream may originate.

In an integrated adsorptive gas separation process embodiment, a steam-to-regeneration stream ratio for an integrated adsorptive gas separation process is equal to or less than about 60%, or specifically equal to or less than about 50%, or more specifically equal to or less than about 40%, or most specifically equal to or less than about 30%.

In an integrated adsorptive gas separation process embodiment, optionally the steam process comprises: recovering at least one of at least a portion of a low pressure steam stream, at least a portion of a very low pressure steam stream, or at least a portion of an ultra-low pressure steam stream from at least one of a first steam turbine, a second steam turbine and/or a third steam turbine; admitting the at least one of at least a portion of a low pressure steam stream, at least a portion of a very low pressure steam stream, or at least a portion of an ultra-low pressure steam stream into at least one condenser or condensing heat exchanger; recovering at least one condensate stream, and recycling the condensate stream into at least one steam generator as at least a portion of a feed water stream.

In an integrated adsorptive gas separation process embodiment, optionally the steam process comprises: recovering at least a portion of at least one of a low pressure steam stream, a very low pressure steam stream, or an ultra-low pressure steam stream from at least one of a first steam turbine, a second steam turbine or a third steam turbine; admitting at least a portion of at least one of a low pressure steam stream, a very low pressure steam stream, or an ultra-low pressure steam stream, optionally with a water stream and/or a condensate stream, into a re-compressor, and forming a steam stream which may be employed and admitted as at least one pre-regeneration stream and/or regeneration stream for an embodiment adsorptive gas separation process (for example, at least one of a pre-regeneration stream, a first regeneration stream, and/or a second regeneration stream for an embodiment adsorptive gas separation process).

Figure 7:
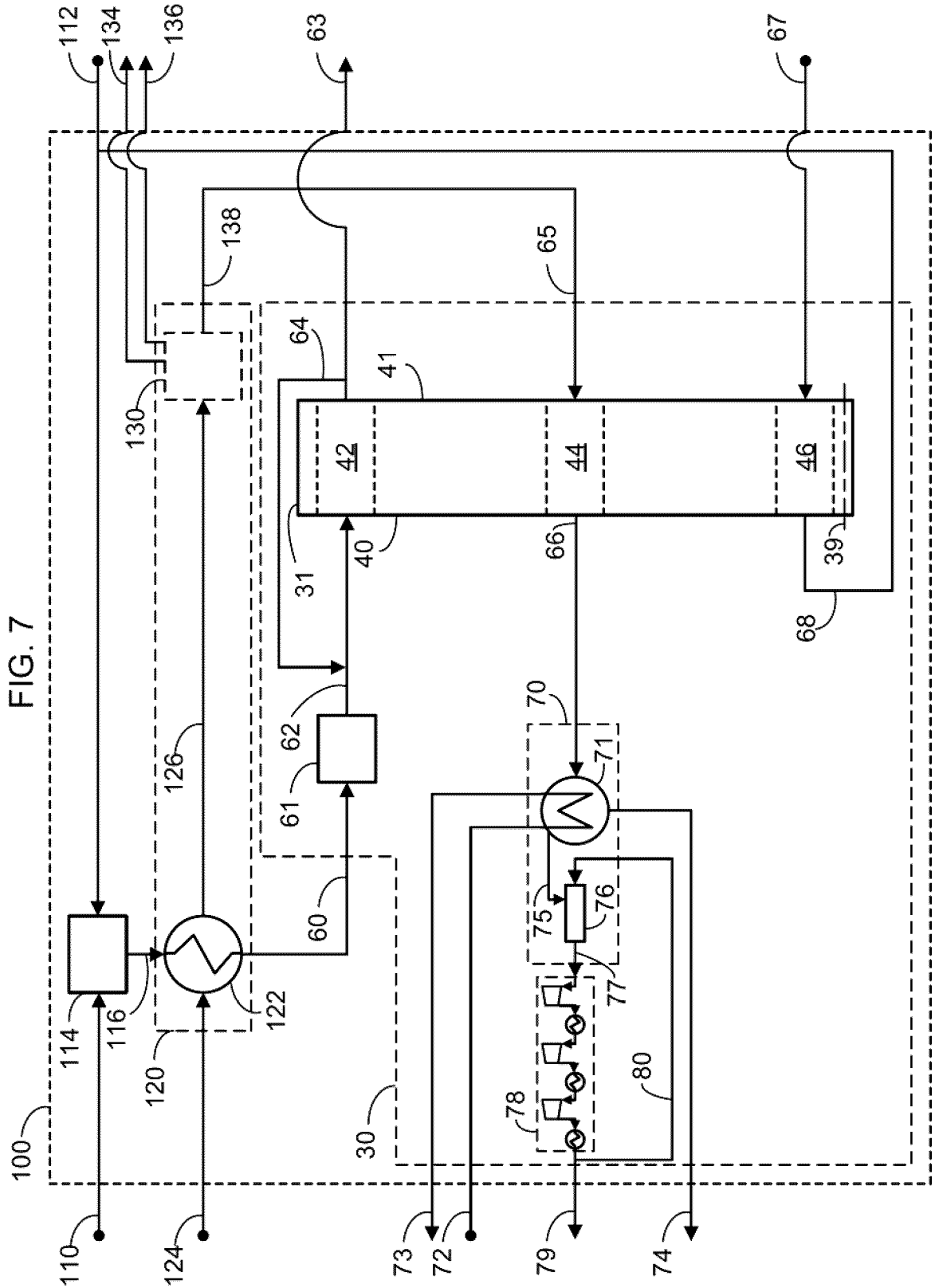
FIG. 7 is a schematic diagram of an adsorptive gas separation system according to an embodiment of the present disclosure, comprising an exemplary adsorptive gas separation assembly as shown in the embodiment in FIG. 4, an exemplary fuel combustor for producing a post-combustion gas stream as a feed stream for the exemplary adsorptive gas separation assembly, and an exemplary steam subsystem for forming a steam stream which may be employed as a regeneration stream for the exemplary adsorptive gas separation assembly.

FIG. 7 is a schematic diagram of an exemplary adsorptive gas separation system 100 according to an embodiment of the present disclosure for adsorptive gas separation of at least a first component from a multi-component fluid mixture or stream. Adsorptive gas separation system 100 comprises: a fuel combustor 114, a steam subsystem 120, and embodiment adsorptive gas separation assembly 30 illustrated in FIG. 4. Fuel combustor 114 may be at least one of: a gas turbine combustor, combined cycle gas turbine combustor, liquid-fuel (such as oil/kerosene/diesel/gasoline and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example. Steam subsystem 120 may further comprise a steam generator 122 (for example, a heat exchanger, a boiler, or a heat recovery steam generator), and a steam turbine assembly 130.

A fuel source (not shown in FIG. 7) may be fluidly connect to admit a fuel stream 110 into adsorptive gas separation system 100 and fuel combustor 114. An oxidant source (not shown in FIG. 7) may be fluidly connected to admit an oxidant stream 112 into adsorptive gas separation system 100 and fuel combustor 114, where oxidant stream 112 and fuel stream 110 may be mixed and combusted to produce a post-combustion gas stream 116. Fuel combustor 114 is fluidly connected to admit post-combustion gas stream 116 into steam subsystem 120 and a hot circuit (not shown in FIG. 7) of steam generator 122. Post-combustion gas stream 116 may transfer heat to a cold circuit (not shown in FIG. 7) of steam generator 122. Hot circuit (not shown in FIG. 7) of steam generator 122 and steam subsystem 120 is fluidly connected to admit post-combustion gas stream 116 as feed stream 60 into adsorptive gas separation assembly 30 and optional DCC 61.

A feed water source (not shown in FIG. 7) may be fluidly connect to admit a feed water stream 124, for example, a water and/or a condensate stream, into adsorptive gas separation system 100, steam subsystem 120, and a cold circuit (not shown in FIG. 7) of steam generator 122, where feed water stream 124 may be converted into a high pressure steam stream or HP steam stream 126. Cold circuit (not shown in FIG. 7) of steam generator 122 may be fluidly connected to admit HP steam stream 126 into steam turbine assembly 130.

Referring to FIGS. 12a and 12b, in one embodiment, exemplary steam turbine assembly 130 may be configured with a single steam turbine as illustrated in FIG. 12a, or a plurality of steam turbines as illustrated in FIG. 12b, for forming at least a very low pressure steam stream or VLP steam stream 65. A steam turbine may be a single stage or a multistage steam turbine. Optionally, a multistage steam turbine may be fluidly connected to recover at least one steam stream between stages. For example, a multistage steam turbine comprising a high pressure stage, an intermediate pressure stage, a low pressure stage and a very low pressure stage, may be fluidly connected to recover at least one steam stream between an intermediate pressure stage and a low pressure stage, and/or recover at least one steam stream between a low pressure stage and a very low pressure stage. Optionally, a steam turbine may be fluidly connected to recover a plurality of steam streams from a single stage of the steam turbine, where the plurality of streams may be recovered having different pressures.

In FIG. 12a, an exemplary steam turbine assembly 130 according to one embodiment may comprise a first steam turbine 140, for example, a multistage steam turbine further comprising a high pressure stage, an intermediate pressure stage, a low pressure stage and a very low pressure stage. Steam generator 122 may be fluidly connected to admit HP steam stream 126 as a feed stream into steam turbine assembly 130 and first steam turbine 140, where HP steam stream 126 may be expanded to form at least a VLP steam stream 138, and optionally an ultra-low pressure steam stream or ULP steam stream 136. First steam turbine 140 and steam turbine assembly 130, may be fluidly connected to admit VLP steam stream 138 as at least one regeneration stream, for example, a first regeneration stream, optionally a pre-regeneration stream, and optionally a second regeneration stream, into an adsorptive gas separation assembly and an adsorptive gas separator. First steam turbine 140 of steam turbine assembly 130 may be fluidly connected to admit ULP steam stream 136 to, for example, a condenser (not shown in FIG. 12a).

In FIG. 12b, an exemplary steam turbine assembly 130 according to a further embodiment may comprise a first steam turbine 142, a second steam turbine 144 (for example, a very low pressure steam turbine), and optionally a third steam turbine 146 (for example, an ultra-low pressure steam turbine). First steam turbine 142 may be a multistage steam turbine further comprising a high pressure stage, an intermediate pressure stage, and a low pressure stage. Steam generator 122 may be fluidly connected to admit HP steam stream 126 as a feed stream into steam turbine assembly 130 and first steam turbine 142, where HP steam stream 126 may be expanded to form at least a low pressure steam stream or LP steam stream 150, and optionally a very low pressure steam stream or VLP steam stream 134. First steam turbine 142 may be fluidly connected to admit LP steam stream 150 as a feed stream into second steam turbine 144 where LP steam stream 150 may be expanded to form VLP steam stream 138 and optionally VLP steam stream 152. First steam turbine 142 and steam turbine assembly 130 may be fluidly connected to admit VLP steam stream 134 to, for example, a condenser (not shown in FIG. 12b). Second steam turbine 144 and steam turbine assembly 130 may be fluidly connected to admit VLP steam stream 138 as at least one regeneration stream, for example, a first regeneration stream, optionally a pre-regeneration stream, and optionally a second regeneration stream, into an adsorptive gas separation assembly and an adsorptive gas separator. Optionally, second steam turbine 144 may be fluidly connected to admit VLP steam stream 152 as a feed stream into third steam turbine 146 where VLP steam stream 152 may be expanded to form an ultra-low pressure steam stream or ULP steam stream 136. Third steam turbine 146, and steam turbine assembly 130 may be fluidly connected to admit ULP steam stream 136 to, for example, a condenser (not shown in FIG. 12b). Optionally first steam turbine 142, second steam turbine 144 and third steam turbine 146 may comprise any number of stages.

Referring to FIG. 7, in a system embodiment, steam turbine assembly 130 of steam subsystem 120 may be fluidly connected to admit VLP steam stream 138 as a first regeneration stream 65 into adsorptive gas separation assembly 30, adsorptive gas separator 31 optionally via a second end 41 and first regeneration zone 44. Steam turbine assembly 130 of steam subsystem 120, and adsorptive gas separation system 100 may be fluidly connected to admit ULP steam stream 136 and optionally VLP steam stream 134 into, for example, a condenser (not shown in FIG. 7).

In a system embodiment, a conditioning stream source, for example, an ambient environment (not shown in FIG. 7), is fluidly connected to admit a conditioning stream 67, for example, an ambient air stream, into adsorptive gas separation system 100, adsorptive gas separation assembly 30, adsorptive gas separator 31 optionally via second end 41, conditioning zone 46, and at least a portion of a contactor (not shown in FIG. 7) in conditioning zone 46. Conditioning zone 46 optionally via first end 40 of adsorptive gas separator 31, may be fluidly connected to admit third product stream 68 into fuel combustor 114 as at least a portion of an oxidant stream, for example oxidant stream 112, admitted into fuel combustor 114.

A coolant source (not shown in FIG. 7) may be fluidly connected to admit a coolant stream 72 into adsorptive gas separation system 100, adsorptive gas separation assembly 30, first condenser stage 70 and a cool circuit (not shown in FIG. 7) of condensing heat exchanger 71. The coolant source (not shown in FIG. 7) may be fluidly connected to recover coolant stream 73 from the cool circuit (not shown in FIG. 7) of condensing heat exchanger 71, first condenser stage 70, adsorptive gas separation assembly 30, and adsorptive gas separation system 100. A condensate storage (not shown in FIG. 7) may be fluidly connected to recover a condensate stream 74 from a hot circuit (not shown in FIG. 7) of condensing heat exchanger 71, first condenser stage 70, adsorptive gas separation assembly 30 and adsorptive gas separation system 100.

An ambient environment (not shown in FIG. 7) may be fluidly connected to recover first product stream 63 from adsorption zone 42, optionally via second end 41 of adsorptive gas separator 31, adsorptive gas separation assembly 30, and adsorptive gas separation system 100 via an optional flue gas stack (not shown in FIG. 7).

Optional compressor 78 of adsorptive gas separation assembly 30 and adsorptive gas separation system 100 may be fluidly connected to admit compressed second product stream 79 into, for example, an end use (not shown in FIG. 7) of compressed second product stream 79.

Figure 8:
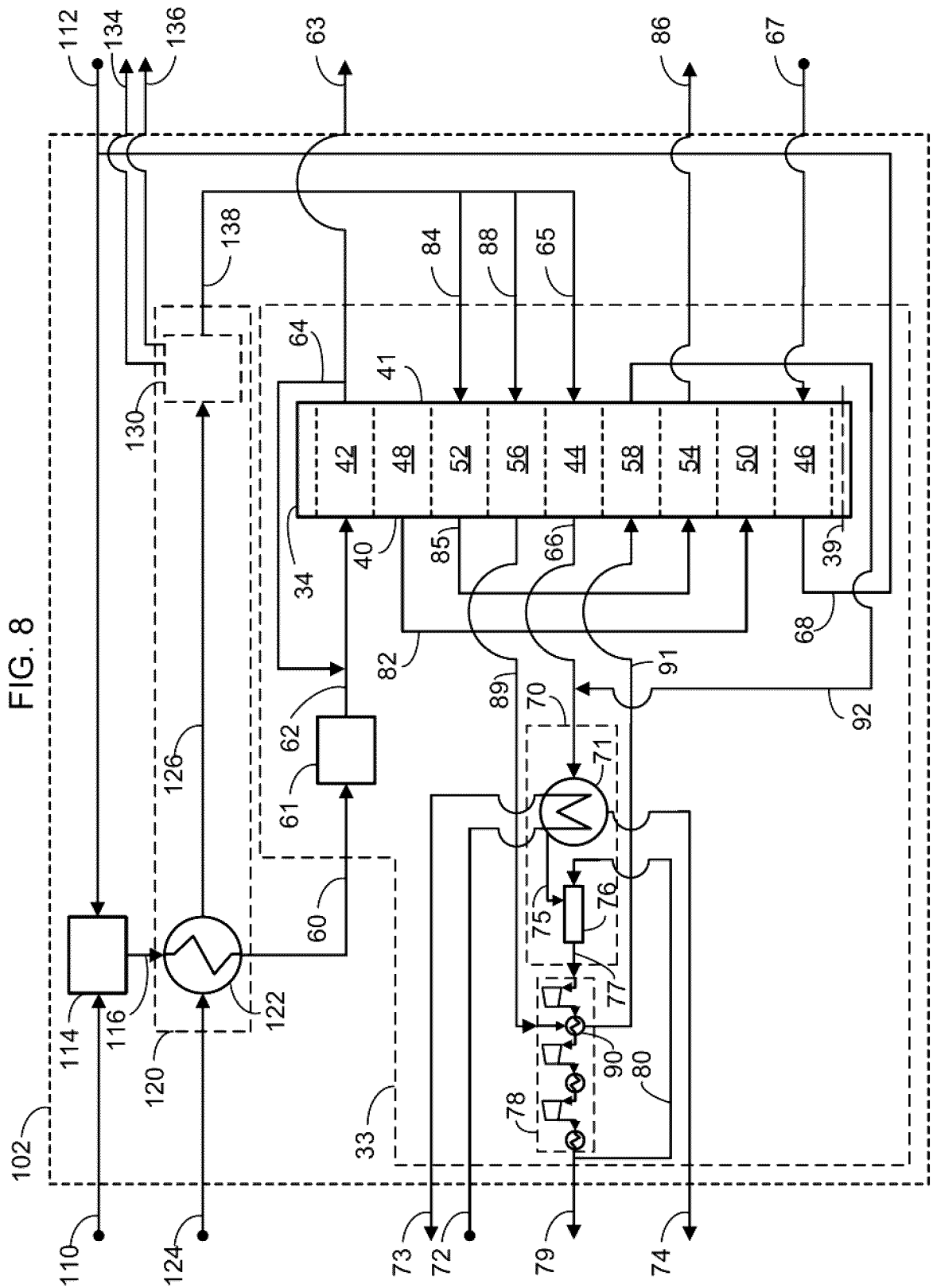
FIG. 8 is a schematic diagram of an adsorptive gas separation system according to an embodiment of the present disclosure, comprising an exemplary embodiment adsorptive gas separation assembly as shown in the embodiment in FIG. 5, an exemplary fuel combustor for producing a post-combustion gas stream as a feed stream for the exemplary adsorptive gas separation assembly, and an exemplary steam subsystem for forming a steam stream which may be employed as at least one regeneration stream for the exemplary adsorptive gas separation assembly.

FIG. 8 is a schematic diagram of an exemplary adsorptive gas separation system 102 according to an embodiment of the present disclosure for adsorptive gas separation of at least a first component from a multi-component fluid mixture or stream. Adsorptive gas separation system 102 comprises: a fuel combustor 114, a steam subsystem 120, and embodiment adsorptive gas separation assembly 33 illustrated in FIG. 5. Fuel combustor 114 may be at least one of: a gas turbine combustor, combined cycle gas turbine combustor, liquid-fuel (such as oil/kerosene/diesel/gasoline and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example. Steam subsystem 120 may further comprise a steam generator 122 (for example, a heat exchanger, a boiler, or a heat recovery steam generator), and a steam turbine assembly 130.

A fuel source (not shown in FIG. 8) may be fluidly connect to admit a fuel stream 110 into adsorptive gas separation system 102 and fuel combustor 114. An oxidant source (not shown in FIG. 8) may be fluidly connected to admit an oxidant stream 112 into adsorptive gas separation system 102 and fuel combustor 114, where oxidant stream 112 and fuel stream 110 may be mixed and combusted to produce a post-combustion gas stream 116. Fuel combustor 114 is fluidly connected to admit post-combustion gas stream 116 into steam subsystem 120 and a hot circuit (not shown in FIG. 8) of steam generator 122. Post-combustion gas stream 116 may transfer heat to a cold circuit (not shown in FIG. 8) of steam generator 122. Hot circuit (not shown in FIG. 8) of steam generator 122 and steam subsystem 120 is fluidly connected to admit post-combustion gas stream 116 as feed stream 60 into adsorptive gas separation assembly 33 and optional DCC 61.

A feed water source (not shown in FIG. 8) may be fluidly connect to admit a feed water stream 124, for example, a water and/or a condensate stream, into adsorptive gas separation system 102, steam subsystem 120, and a cold circuit (not shown in FIG. 8) of steam generator 122, where feed water stream 124 may be converted into a high pressure steam stream or HP steam stream 126. Cold circuit (not shown in FIG. 8) of steam generator 122 may be fluidly connected to admit HP steam stream 126 into steam turbine assembly 130.

In a system embodiment, steam turbine assembly 130 of steam subsystem 120 may be fluidly connected to admit VLP steam stream 138 as at least one of: first regeneration stream 65, pre-regeneration stream 84, and second regeneration stream 88, into adsorptive gas separation assembly 33, adsorptive gas separator 34 optionally via a second end 41, first regeneration zone 44, optionally, pre-regeneration zone 52, and optionally second regeneration zone 56. Steam turbine assembly 130 of steam subsystem 120 and adsorptive gas separation system 102 may be fluidly connected to admit ULP steam stream 136 and optionally VLP steam stream 134 into, for example, a condenser (not shown in FIG. 8).

In a system embodiment, a conditioning stream source, for example, an ambient environment (not shown in FIG. 8), is fluidly connected to admit a conditioning stream 67, for example, an ambient air stream, into adsorptive gas separation system 102, adsorptive gas separation assembly 33, adsorptive gas separator 34 optionally via second end 41, conditioning zone 46, and at least a portion of a contactor (not shown in FIG. 8) in conditioning zone 46. Conditioning zone 46, optionally via first end 40 of adsorptive gas separator 34, may be fluidly connected to admit third product stream 68 into fuel combustor 114 as at least a portion of an oxidant stream, for example oxidant stream 112, admitted into fuel combustor 114.

A coolant source (not shown in FIG. 8) may be fluidly connected to admit a coolant stream 72 into adsorptive gas separation system 102, adsorptive gas separation assembly 33, first condenser stage 70 and a cool circuit (not shown in FIG. 8) of condensing heat exchanger 71. The coolant source (not shown in FIG. 8) may be fluidly connected to recover coolant stream 73 from the cool circuit (not shown in FIG. 8) of condensing heat exchanger 71, first condenser stage 70, adsorptive gas separation assembly 33, and adsorptive gas separation system 102. A condensate storage (not shown in FIG. 8) may be fluidly connected to recover a condensate stream 74 from a hot circuit (not shown in FIG. 8) of condensing heat exchanger 71, first condenser stage 70, adsorptive gas separation assembly 33 and adsorptive gas separation system 102.

An ambient environment (not shown in FIG. 8) may be fluidly connected to recover first product stream 63 from adsorption zone 42, optionally via second end 41 of adsorptive gas separator 34, adsorptive gas separation assembly 33, and adsorptive gas separation system 102 via an optional flue gas stack (not shown in FIG. 8).

Optional compressor 78 of adsorptive gas separation assembly 33 and adsorptive gas separation system 102 may be fluidly connected to admit compressed second product stream 79 into, for example, an end use (not shown in FIG. 8) of compressed second product stream 79.

Optional reflux zone 54, optionally via second end 41 of adsorptive gas separator 34 may be fluidly connected to admit fourth product stream 86 into an end use (not shown in FIG. 8) of fourth product stream 86, or optionally into a condenser, for example, condensing heat exchanger 71, to condense and recover condensable components, for example, water, from fourth product stream 86.

Figure 9:
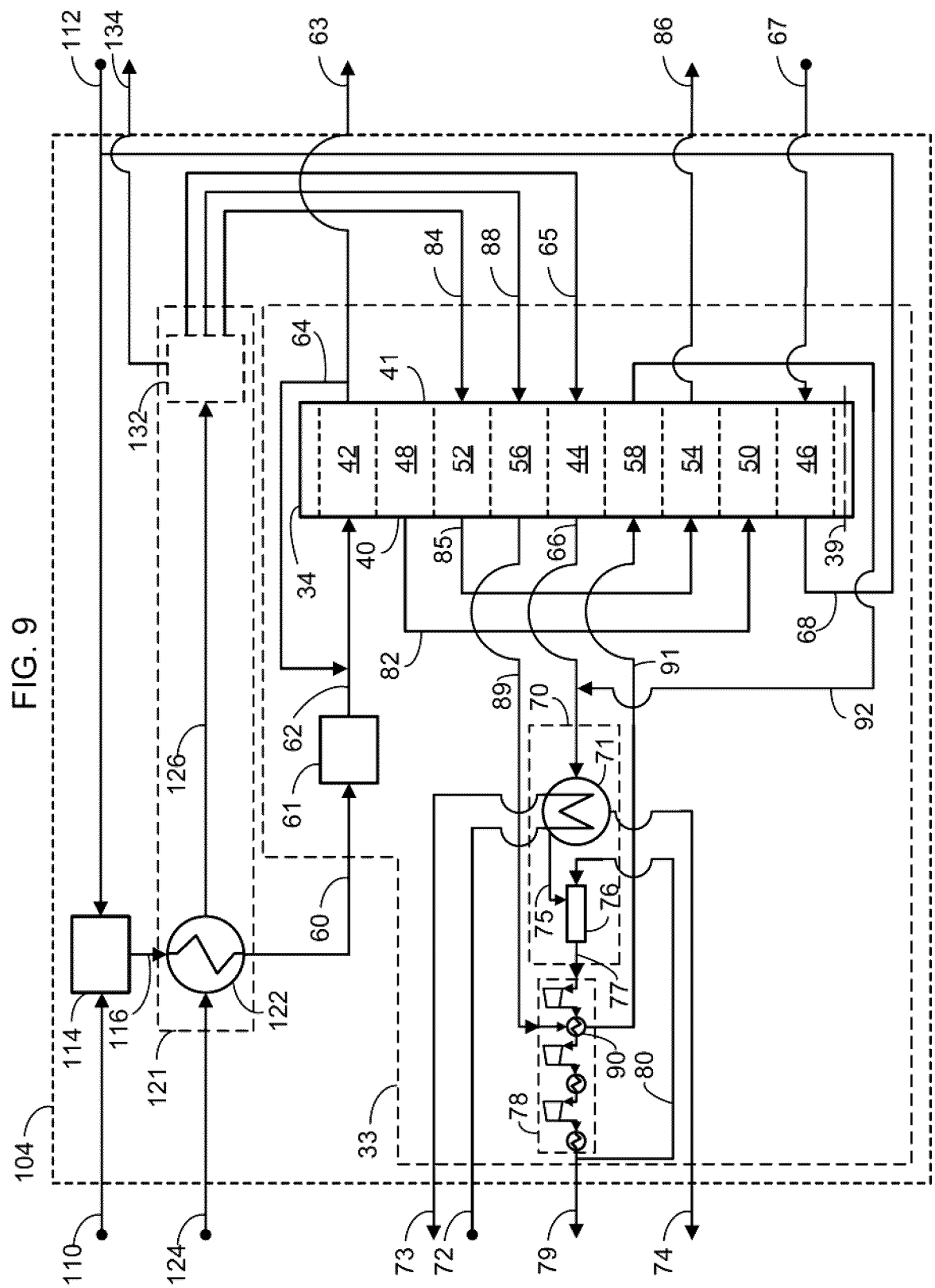
FIG. 9 is a schematic diagram of an adsorptive gas separation system according to an embodiment of the present disclosure, comprising an exemplary adsorptive gas separation assembly as shown in the embodiment in FIG. 5, an exemplary fuel combustor for producing a post-combustion gas stream as a feed stream for the exemplary embodiment adsorptive gas separation assembly, and an exemplary steam subsystem for forming a plurality of steam streams which may be employed as regeneration streams for the exemplary adsorptive gas separation assembly.

FIG. 9 is a schematic diagram of an exemplary adsorptive gas separation system 104 according to an embodiment of the present disclosure, for adsorptive gas separation of at least a first component from a multi-component fluid mixture or stream. Adsorptive gas separation system 104 comprises: a fuel combustor 114, a steam subsystem 121, and embodiment adsorptive gas separation assembly 33 illustrated in FIG. 5. Fuel combustor 114 may be at least one of: a gas turbine combustor, combined cycle gas turbine combustor, liquid-fuel (such as oil/kerosene/diesel/gasoline and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example. Steam subsystem 121 may further comprise a steam generator 122 (for example, a heat exchanger, a boiler, or a heat recovery steam generator), and a steam turbine assembly 132.

A fuel source (not shown in FIG. 9) may be fluidly connect to admit a fuel stream 110 into adsorptive gas separation system 104 and fuel combustor 114. An oxidant source (not shown in FIG. 9) may be fluidly connected to admit an oxidant stream 112 into adsorptive gas separation system 104 and fuel combustor 114, where oxidant stream 112 and fuel stream 110 may be mixed and combusted to produce a post-combustion gas stream 116. Fuel combustor 114 is fluidly connected to admit post-combustion gas stream 116 into steam subsystem 121 and a hot circuit (not shown in FIG. 9) of steam generator 122. Post-combustion gas stream 116 may transfer heat to a cold circuit (not shown in FIG. 9) of steam generator 122. Hot circuit (not shown in FIG. 9) of steam generator 122 and steam subsystem 121 is fluidly connected to admit post-combustion gas stream 116 as feed stream 60 into adsorptive gas separation assembly 33 and optional DCC 61.

A feed water source (not shown in FIG. 9) may be fluidly connect to admit a feed water stream 124, for example, a water and/or a condensate stream, into adsorptive gas separation system 104, steam subsystem 121, and a cold circuit (not shown in FIG. 9) of steam generator 122, where feed water stream 124 may be converted into a high pressure steam stream or HP steam stream 126. Cold circuit (not shown in FIG. 9) of steam generator 122 may be fluidly connected to admit HP steam stream 126 into steam turbine assembly 132.

Referring to FIG. 12c, in a system embodiment, an exemplary steam turbine assembly 132 may comprise a first steam turbine 148, for example, a multistage steam turbine further comprising a high pressure stage, an intermediate pressure stage, and a low pressure stage. Steam generator 122 may be fluidly connected to admit HP steam stream 126 as a feed stream into steam turbine assembly 132 and first steam turbine 148, where HP steam stream 126 may be expanded to form a plurality of very low pressure steam streams, for example, VLP steam stream 154, VLP steam stream 156, and VLP steam stream 158, and optionally VLP steam stream 134. First steam turbine 148 may be fluidly connected to recover a plurality of steam streams from a single stage, for example, a low pressure stage, where at least a first steam stream may be at a first pressure, a second steam stream may be at a second pressure, and the first pressure is less than or greater than the second pressure. For example, VLP steam stream 154, VLP steam stream 156, and VLP steam stream 158 may be recovered optionally from a low pressure stage of first steam turbine 148, where VLP steam stream 154 is at a first pressure, VLP steam stream 156 is at a second pressure, and VLP steam stream 158 is at a third pressure, where the first pressure is greater than the second pressure and the second pressure is greater than the third pressure. VLP steam stream 154 may optionally be employed as pre-regeneration stream 84, VLP steam stream 156 may optionally be employed as second regeneration stream 88, and VLP steam stream 158 may optionally be employed as first regeneration stream 65. Optionally, a multistage steam turbine may be fluidly connected to recover at least one steam stream between stages. For example, a multistage steam turbine comprising a high pressure stage, an intermediate pressure stage, a low pressure stage and a very low pressure stage, may be fluidly connected to recover at least one steam stream between an intermediate pressure stage and a low pressure stage, and/or between a low pressure stage and a very low pressure stage. Optionally, a steam turbine may be fluidly connected to recover a plurality of steam streams from a stage of the steam turbine, where the plurality of streams may each have a pressure which are substantially equal.

In a system embodiment, steam turbine assembly 132 of steam subsystem 121 may be fluidly connected to admit: VLP steam stream 154 as pre-regeneration stream 84 into adsorptive gas separation assembly 33, adsorptive gas separator 34 optionally via second end 41, and pre-regeneration zone 52; VLP steam stream 156 as second regeneration stream 88 into adsorptive gas separation assembly 33, adsorptive gas separator 34 optionally via second end 41, and second regeneration zone 56; VLP steam stream 158 as first regeneration stream 65 into adsorptive gas separation assembly 33, adsorptive gas separator 34 optionally via second end 41, and first regeneration zone 44, and VLP steam stream 134 to, for example, a condenser (not shown in FIG. 9).

In a system embodiment, a conditioning stream source, for example, an ambient environment (not shown in FIG. 9), is fluidly connected to admit a conditioning stream 67, for example, an ambient air stream, into adsorptive gas separation system 104, adsorptive gas separation assembly 33, adsorptive gas separator 34 optionally via second end 41, conditioning zone 46, and at least a portion of a contactor (not shown in FIG. 9) in conditioning zone 46. Conditioning zone 46, optionally via first end 40 of adsorptive gas separator 34, may be fluidly connected to admit third product stream 68 into fuel combustor 114 as at least a portion of an oxidant stream, for example oxidant stream 112, admitted into fuel combustor 114.

A coolant source (not shown in FIG. 9) may be fluidly connected to admit a coolant stream 72 into adsorptive gas separation system 104, adsorptive gas separation assembly 33, first condenser stage 70 and a cool circuit (not shown in FIG. 9) of condensing heat exchanger 71. The coolant source (not shown in FIG. 9) may be fluidly connected to recover coolant stream 73 from the cool circuit (not shown in FIG. 9) of condensing heat exchanger 71 of first condenser stage 70, adsorptive gas separation assembly 33, and adsorptive gas separation system 104. A condensate storage (not shown in FIG. 9) may be fluidly connected to recover a condensate stream 74 from a hot circuit (not shown in FIG. 9) of condensing heat exchanger 71 of first condenser stage 70, adsorptive gas separation assembly 33 and adsorptive gas separation system 104.

An ambient environment (not shown in FIG. 9) may be fluidly connected to recover first product stream 63 from at least a portion of a contactor (not shown in FIG. 9) in adsorption zone 42, via adsorption zone 42, optionally second end 41, adsorptive gas separator 34, adsorptive gas separation assembly 33, and adsorptive gas separation system 104, via an optional flue gas stack (not shown in FIG. 9).

Optional compressor 78 of adsorptive gas separation assembly 33 and adsorptive gas separation system 104 may be fluidly connected to admit compressed second product stream 79 into, for example, an end use (not shown in FIG. 9) of compressed second product stream 79.

Optional reflux zone 54, optionally via second end 41 of adsorptive gas separator 34 may be fluidly connected to admit fourth product stream 86 into an end use (not shown in FIG. 9) of fourth product stream 86, or optionally into a condenser, for example, condensing heat exchanger 71, to condense and recover condensable components, for example, water, from fourth product stream 86.

Figure 10:
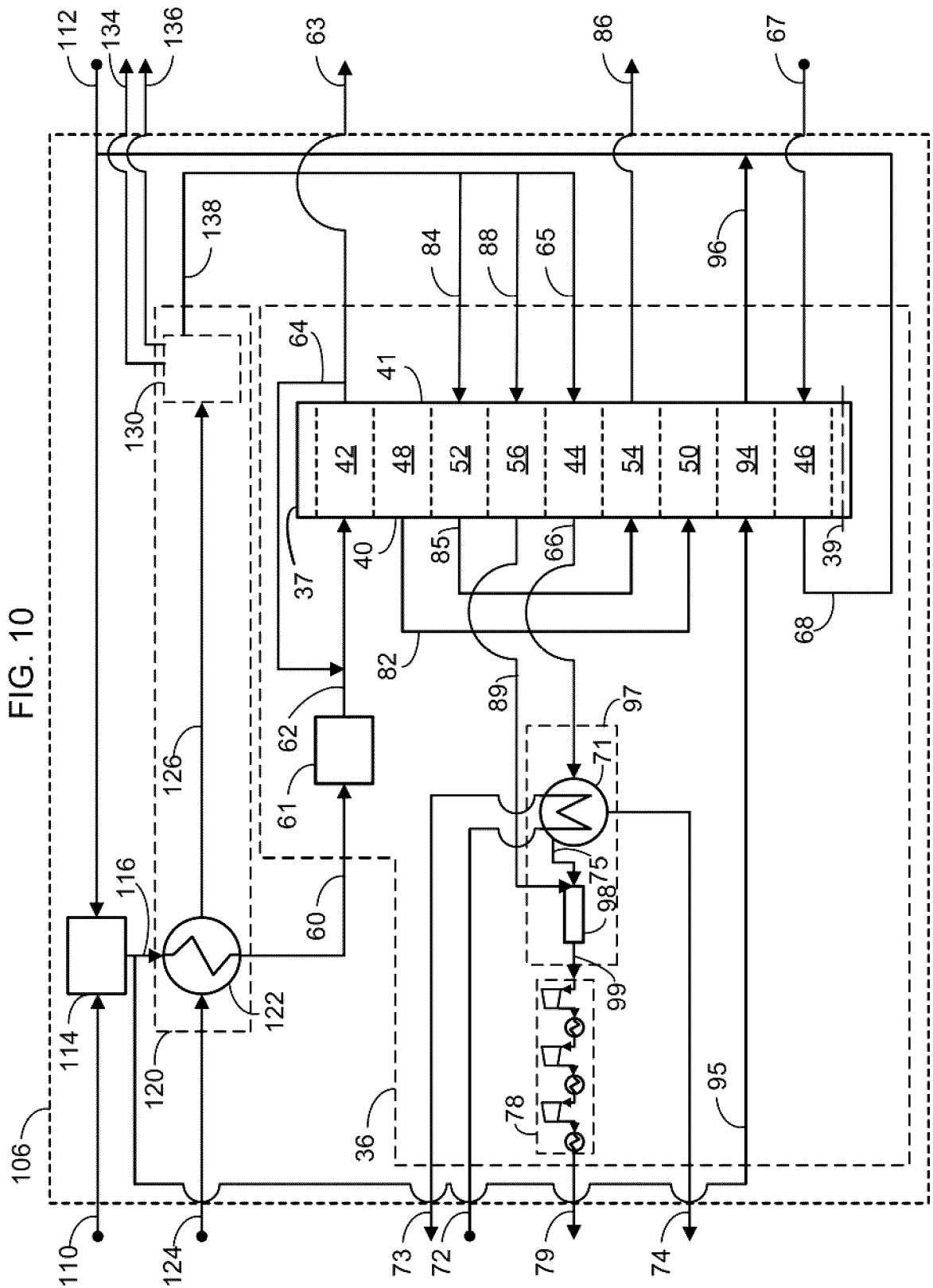
FIG. 10 is a schematic diagram of an adsorptive gas separation system according to an embodiment of the present disclosure, comprising an exemplary adsorptive gas separation assembly as shown in the embodiment in FIG. 6, an exemplary fuel combustor for producing a post-combustion gas stream as a feed stream for the exemplary adsorptive gas separation assembly, and an exemplary steam subsystem for forming a steam stream which may be employed as at least one regeneration stream for the exemplary t adsorptive gas separation assembly.

FIG. 10 is a schematic diagram of an exemplary adsorptive gas separation system 106 according to an embodiment of the present disclosure, for adsorptive gas separation of at least a first component from a multi-component fluid mixture or stream. Adsorptive gas separation system 106 comprises: a fuel combustor 114, a steam subsystem 120, and embodiment adsorptive gas separation assembly 36 illustrated in FIG. 6. Fuel combustor 114 may be at least one of: a gas turbine combustor, combined cycle gas turbine combustor, liquid-fuel (such as oil/kerosene/diesel/gasoline and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example. Steam subsystem 120 may further comprise a steam generator 122 (for example, a heat exchanger, a boiler, or a heat recovery steam generator), and a steam turbine assembly 130.

A fuel source (not shown in FIG. 10) may be fluidly connect to admit a fuel stream 110 into adsorptive gas separation system 106 and fuel combustor 114. An oxidant source (not shown in FIG. 10) may be fluidly connected to admit an oxidant stream 112 into adsorptive gas separation system 106 and fuel combustor 114, where oxidant stream 112 and fuel stream 110 may be mixed and combusted to produce a post-combustion gas stream 116. Fuel combustor 114 is fluidly connected to admit post-combustion gas stream 116 into steam subsystem 120 and a hot circuit (not shown in FIG. 10) of steam generator 122. Post-combustion gas stream 116 may transfer heat to a cold circuit (not shown in FIG. 10) of steam generator 122. Hot circuit (not shown in FIG. 10) of steam generator 122 and steam subsystem 120 is fluidly connected to admit post-combustion gas stream 116 as feed stream 60 into adsorptive gas separation assembly 36 and optional DCC 61.

A feed water source (not shown in FIG. 10) may be fluidly connect to admit a feed water stream 124, for example, a water and/or a condensate stream, into adsorptive gas separation system 106, steam subsystem 120, and a cold circuit (not shown in FIG. 10) of steam generator 122, where feed water stream 124 may be converted into a high pressure steam stream or HP steam stream 126. Cold circuit (not shown in FIG. 10) of steam generator 122 may be fluidly connected to admit HP steam stream 126 into steam turbine assembly 130.

In a system embodiment, steam turbine assembly 130 and steam subsystem 120 may be fluidly connected to admit VLP steam stream 138 as at least one of: first regeneration stream 65, pre-regeneration stream 84, and second regeneration stream 88, into adsorptive gas separation assembly 36, adsorptive gas separator 37 optionally via a second end 41, first regeneration zone 44, optionally, pre-regeneration zone 52, and optionally second regeneration zone 56. Steam turbine assembly 130 of steam subsystem 120, and adsorptive gas separation system 102 may be fluidly connected to admit ULP steam stream 136 and optionally VLP steam stream 134 into, for example, a condenser (not shown in FIG. 10).

In a system embodiment, a conditioning stream source, for example, an ambient environment (not shown in FIG. 10), is fluidly connected to admit a conditioning stream 67, for example, an ambient air stream, into adsorptive gas separation system 106, adsorptive gas separation assembly 36, adsorptive gas separator 37 optionally via second end 41, conditioning zone 46, and at least a portion of a contactor (not shown in FIG. 10) in conditioning zone 46. Conditioning zone 46, optionally via first end 40 of adsorptive gas separator 37 may be fluidly connected to admit third product stream 68 into fuel combustor 114 as at least a portion of an oxidant stream, for example, oxidant stream 112, admitted into fuel combustor 114.

In a system embodiment, a fourth regeneration stream source, for example, fuel combustor 114, may be fluidly connected to admit a portion of post-combustion gas stream 116 as a fourth regeneration stream 95 into adsorptive gas separation assembly 36, adsorptive gas separator 37 optionally via first end 40, fourth regeneration zone 94, and at least a portion of a contactor (not shown in FIG. 10) in fourth regeneration zone 94. Fourth regeneration stream 95, may be at a temperature equal to or greater than a condensation temperature of a second component in fourth regeneration zone 94. Optionally, hot circuit (not shown in FIG. 10) of steam generator 122 of steam subsystem 120 may be fluidly connected to admit a portion of post-combustion gas stream 116 or a portion of feed stream 60, as a fourth regeneration stream 95 into adsorptive gas separation assembly 36, adsorptive gas separator 37 optionally via first end 40, fourth regeneration zone 94, and at least a portion of a contactor (not shown in FIG. 10) in fourth regeneration zone 94. Alternatively, a fourth regeneration stream source, for example, a heat exchanger or a heater for heating a gas stream (all not shown in FIG. 10), may be fluidly connected to admit a fourth regeneration stream 95, for example, an air stream (not shown in FIG. 10), at a temperature, for example, equal to or greater than a condensation temperature of a second component in fourth regeneration zone 94, into adsorptive gas separation system 106, adsorptive gas separation assembly 36, adsorptive gas separator 37 optionally via first end 40, fourth regeneration zone 94, and at least a portion of a contactor (not shown in FIG. 10) in fourth regeneration zone 94. Fourth regeneration zone 94, adsorptive gas separator 37 optionally via second end 41, may be fluidly connected to admit seventh product stream 96 into fuel combustor 114 as at least a portion of an oxidant stream, for example, oxidant stream 112 and third product stream 68, admitted into fuel combustor 114.

A coolant source (not shown in FIG. 10) may be fluidly connected to admit a coolant stream 72 into adsorptive gas separation system 106, adsorptive gas separation assembly 36, first condenser stage 97 and a cool circuit (not shown in FIG. 10) of condensing heat exchanger 71. The coolant source (not shown in FIG. 10) may be fluidly connected to recover coolant stream 73 from the cool circuit (not shown in FIG. 10) of condensing heat exchanger 71, first condenser stage 97, adsorptive gas separation assembly 36, and adsorptive gas separation system 106. A condensate storage (not shown in FIG. 10) may be fluidly connected to recover a condensate stream 74 from a hot circuit (not shown in FIG. 10) of condensing heat exchanger 71, first condenser stage 97, adsorptive gas separation assembly 36 and adsorptive gas separation system 106.

In one embodiment, an ambient environment (not shown in FIG. 10) may be fluidly connected to recover first product stream 63 from adsorption zone 42, optionally via second end 41 of adsorptive gas separator 37, adsorptive gas separation assembly 36, and adsorptive gas separation system 106 via an optional flue gas stack (not shown in FIG. 10).

Optional compressor 78 of adsorptive gas separation assembly 36 and adsorptive gas separation system 106 may be fluidly connected to admit compressed second product stream 79 into, for example, an end use (not shown in FIG. 10) of compressed second product stream 79.

Optional reflux zone 54, optionally via second end 41 of adsorptive gas separator 37 may be fluidly connected to admit fourth product stream 86 into an end use (not shown in FIG. 10) of fourth product stream 86, or optionally into a condenser, for example, condensing heat exchanger 71, to condense and recover condensable components, for example, water, from fourth product stream 86.

Figure 11:
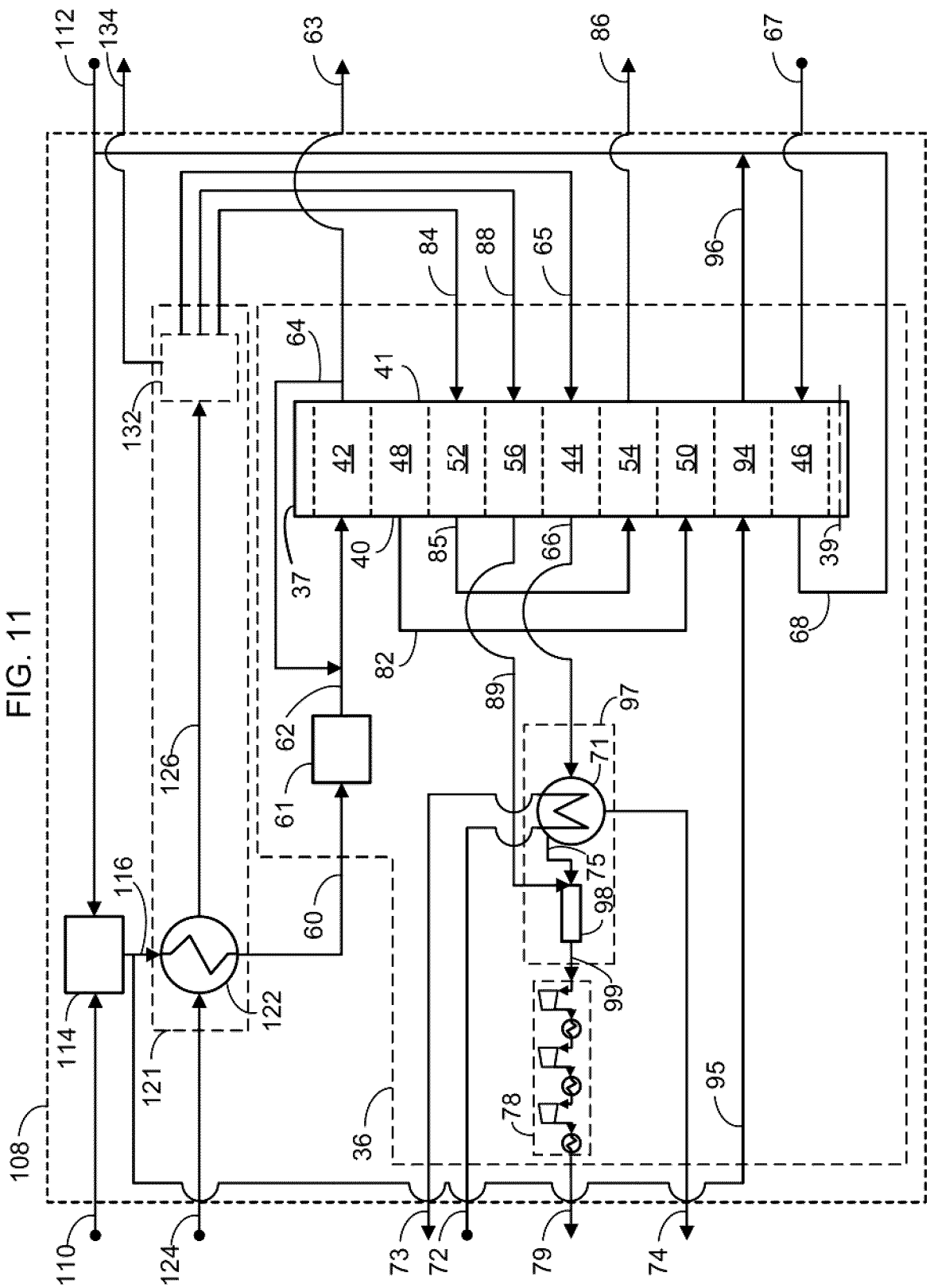
FIG. 11 is a schematic diagram of an adsorptive gas separation system according to an embodiment of the present disclosure, comprising an exemplary adsorptive gas separation assembly as shown in the embodiment in FIG. 6, an exemplary fuel combustor for producing a post-combustion gas stream as a feed stream for the exemplary t adsorptive gas separation assembly, and an exemplary steam subsystem for forming a plurality of steam streams which may be employed as at least one regeneration stream for the exemplary adsorptive gas separation assembly.

FIG. 11 is a schematic diagram of an exemplary adsorptive gas separation system 108 according to an embodiment of the present disclosure, for adsorptive gas separation of at least a first component from a multi-component fluid mixture or stream. Adsorptive gas separation system 108 comprises: a fuel combustor 114, a steam subsystem 121, and embodiment adsorptive gas separation assembly 36 illustrated in FIG. 6. Fuel combustor 114 may be at least one of: a gas turbine combustor, combined cycle gas turbine combustor, liquid-fuel (such as oil/kerosene/diesel/gasoline and other liquid fuel fired) combustor, coal-fired combustor (including solid, pulverized, gasified or other forms of coal-fueled combustors such as coal-fired power generation plants), biomass solid and/or liquid fuel combustor, steam generator/boiler combustor, and process heater combustor (such as may be used in refinery and/or industrial processes to heat process fluids and/or gases), for example. Steam subsystem 121 may further comprise a steam generator 122 (for example, a heat exchanger, a boiler, or a heat recovery steam generator), and a steam turbine assembly 132.

A fuel source (not shown in FIG. 11) may be fluidly connect to admit a fuel stream 110 into adsorptive gas separation system 108 and fuel combustor 114. An oxidant source (not shown in FIG. 11) may be fluidly connected to admit an oxidant stream 112 into adsorptive gas separation system 108 and fuel combustor 114, where oxidant stream 112 and fuel stream 110 may be mixed and combusted to produce a post-combustion gas stream 116. Fuel combustor 114 is fluidly connected to admit post-combustion gas stream 116 into steam subsystem 121 and a hot circuit (not shown in FIG. 11) of steam generator 122. Post-combustion gas stream 116 may transfer heat to a cold circuit (not shown in FIG. 11) of steam generator 122. Hot circuit (not shown in FIG. 11) of steam generator 122 and steam subsystem 121 is fluidly connected to admit post-combustion gas stream 116 as feed stream 60 into adsorptive gas separation assembly 36 and optional DCC 61.

A feed water source (not shown in FIG. 11) may be fluidly connect to admit a feed water stream 124, for example, a water and/or a condensate stream, into adsorptive gas separation system 108, steam subsystem 121, and a cold circuit (not shown in FIG. 11) of steam generator 122, where feed water stream 124 may be converted into a high pressure steam stream or HP steam stream 126. Cold circuit (not shown in FIG. 11) of steam generator 122 may be fluidly connected to admit HP steam stream 126 into steam turbine assembly 132.

Referring to FIG. 12c, in a system embodiment, an exemplary steam turbine assembly 132 may comprise a first steam turbine 148, for example, a multistage steam turbine further comprising a high pressure stage, an intermediate pressure stage, and a low pressure stage. Steam generator 122 may be fluidly connected to admit HP steam stream 126 as a feed stream into steam turbine assembly 132 and first steam turbine 148, where HP steam stream 126 may be expanded to form a plurality of very low pressure steam streams, for example, VLP steam stream 154, VLP steam stream 156, and VLP steam stream 158, and optionally VLP steam stream 134. First steam turbine 148 may be fluidly connected to recover a plurality of steam streams from a single stage, for example, a low pressure stage, where at least a first steam stream may be at a first pressure, a second steam stream may be at a second pressure, and the first pressure is less than or greater than the second pressure. For example, VLP steam stream 154, VLP steam stream 156, and VLP steam stream 158 may be recovered optionally from a low pressure stage of first steam turbine 148, where VLP steam stream 154 is at a first pressure, VLP steam stream 156 is at a second pressure, and VLP steam stream 158 is at a third pressure, where the first pressure is greater than the second pressure and the second pressure is greater than the third pressure. VLP steam stream 154 may be employed as pre-regeneration stream 84, VLP steam stream 156 may be employed as second regeneration stream 88, and VLP steam stream 158 may be employed as first regeneration stream 65.

In a system embodiment, steam turbine assembly 132 and steam subsystem 121 may be fluidly connected to admit: VLP steam stream 154 as pre-regeneration stream 84 into adsorptive gas separation assembly 36, adsorptive gas separator 37 optionally via second end 41, and pre-regeneration zone 52; VLP steam stream 156 as second regeneration stream 88 into adsorptive gas separation assembly 36, adsorptive gas separator 37 optionally via second end 41, and second regeneration zone 56; VLP steam stream 158 as first regeneration stream 65 into adsorptive gas separation assembly 36, adsorptive gas separator 37 optionally via second end 41, and first regeneration zone 44 and VLP steam stream 134 to, for example, a condenser (not shown in FIG. 11).

In a system embodiment, a conditioning stream source, for example, an ambient environment (not shown in FIG. 11), is fluidly connected to admit a conditioning stream 67, for example, an ambient air stream, into adsorptive gas separation system 108, adsorptive gas separation assembly 36, adsorptive gas separator 37 optionally via second end 41, conditioning zone 46, and at least a portion of a contactor (not shown in FIG. 11) in conditioning zone 46. Conditioning zone 46, optionally via first end 40 of adsorptive gas separator 37, may be fluidly connected to admit third product stream 68 into fuel combustor 114 as at least a portion of an oxidant stream, for example oxidant stream 112, admitted into fuel combustor 114.

In a system embodiment, a fourth regeneration stream source, for example, fuel combustor 114, may be fluidly connected to admit a portion of post-combustion gas stream 116 as a fourth regeneration stream 95 into adsorptive gas separation assembly 36, optionally via first end 40 of adsorptive gas separator 37, fourth regeneration zone 94, and at least a portion of a contactor (not shown in FIG. 11) in fourth regeneration zone 94. Fourth regeneration stream 95, may be at a temperature equal to or greater than a condensation temperature of a second component in fourth regeneration zone 94. Optionally, hot circuit (not shown in FIG. 11) of steam generator 122 and steam subsystem 120 may be fluidly connected to admit a portion of post-combustion gas stream 116 or a portion of feed stream 60, as a fourth regeneration stream 95 into adsorptive gas separation assembly 36, adsorptive gas separator 37 optionally via second end 41, fourth regeneration zone 94, and at least a portion of a contactor (not shown in FIG. 11) in fourth regeneration zone 94. Alternatively, a fourth regeneration stream source via, for example, a heat exchanger or a heater for heating a gas stream (all not shown in FIG. 11), may be fluidly connected to admit a fourth regeneration stream 95, for example, an air stream (not shown in FIG. 11), at a temperature equal to or greater than a condensation temperature of a second component in fourth regeneration zone 94, into adsorptive gas separation system 106, adsorptive gas separation assembly 36, adsorptive gas separator 37 optionally via second end 41, fourth regeneration zone 94, and at least a portion of a contactor (not shown in FIG. 11) in fourth regeneration zone 94. Fourth regeneration zone 94, optionally via second end 41 of adsorptive gas separator 37, may be fluidly connected to admit seventh product stream 96 into fuel combustor 114 as at least a portion of an oxidant stream, for example, oxidant stream 112 and third product stream 68, admitted into fuel combustor 114.

A coolant source (not shown in FIG. 11) may be fluidly connected to admit a coolant stream 72 into adsorptive gas separation system 108, adsorptive gas separation assembly 36, first condenser stage 97 and a cool circuit (not shown in FIG. 11) of condensing heat exchanger 71. The coolant source (not shown in FIG. 11) may be fluidly connected to recover coolant stream 73 from the cool circuit (not shown in FIG. 11) of condensing heat exchanger 71, first condenser stage 97, adsorptive gas separation assembly 36, and adsorptive gas separation system 108. A condensate storage (not shown in FIG. 11) may be fluidly connected to recover a condensate stream 74 from a hot circuit (not shown in FIG. 11) of condensing heat exchanger 71, first condenser stage 97, adsorptive gas separation assembly 36 and adsorptive gas separation system 108.

In one embodiment, an ambient environment (not shown in FIG. 11) may be fluidly connected to recover first product stream 63 from adsorption zone 42, optionally via second end 41 of adsorptive gas separator 37, adsorptive gas separation assembly 36, and adsorptive gas separation system 108, via an optional flue gas stack (not shown in FIG. 11).

Optional compressor 78 of adsorptive gas separation assembly 36 and adsorptive gas separation system 108 may be fluidly connected to admit compressed second product stream 79 into, for example, an end use (not shown in FIG. 11) of compressed second product stream 79.

Optional reflux zone 54, optionally via second end 41 of adsorptive gas separator 37 may be fluidly connected to admit fourth product stream 86 into an end use (not shown in FIG. 11) of fourth product stream 86, or optionally into a condenser, for example, condensing heat exchanger 71, to condense and recover condensable components, for example, water, from fourth product stream 86.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof. Accordingly, the scope of the invention is to be construed in accordance with the substance defined by the following claims.

What is claimed is:

1. An adsorptive gas separation process for separating at least a first component from a multi-component fluid mixture, the process comprising:
    (a) admitting said multi-component fluid mixture comprising at least said first component, at a pressure equal to or greater than a first pressure threshold as a feed stream into an adsorptive gas separator comprising at least one adsorbent material in at least one contactor and an adsorption zone of said at least one contactor, adsorbing at least a portion of said first component on said at least one adsorbent material in said adsorption zone of said at least one contactor to form a first product stream depleted in said first component relative to said feed stream, and recovering said first product stream from said at least one contactor;
    (b) admitting a second regeneration stream, at a sub-ambient pressure, having a second component into said adsorptive gas separator and a second regeneration zone of said at least one contactor, adsorbing at least a portion of said second component of said second regeneration stream on said at least one adsorbent material, desorbing at least a portion of said first component adsorbed on said at least one adsorbent material to form a fifth product stream enriched in at least one of said first component and said second component relative to said feed stream, and recovering said fifth product stream from said second regeneration zone of said at least one contactor;
    (c) admitting a first regeneration stream comprising said second component into said adsorptive gas separator and a first regeneration zone of said at least one contactor, desorbing at least a portion of said first component adsorbed on said at least one adsorbent material in said first regeneration zone to form a second product stream enriched in at least one of said first component and said second component relative to said feed stream, recovering said second product stream from said first regeneration zone of said at least one contactor and said adsorptive gas separator, admitting at least a portion of said second product stream into at least a first condenser, causing at least a portion of said second component in said second product stream to condense, to form a purified second product stream and a first condensate stream, fluidly connecting said first condenser to said adsorptive gas separator and inducing a reduction in pressure in at least said first regeneration zone of said at least one contactor to a pressure of equal to or less than a second pressure threshold, and recovering said purified second product stream and said first condensate stream from said condenser; and
    (d) admitting a conditioning stream into a conditioning zone of said at least one contactor, increasing a pressure of said conditioning zone of said at least one contactor to a pressure greater than said second pressure threshold to form a third product stream and recovering said third product stream from said at least one contactor.

2. The process of claim 1, further comprising, prior to step (c), admitting at least a pre-regeneration stream into said adsorptive gas separator and into a pre-regeneration zone of said at least one contactor, desorbing a portion of the first component adsorbed on the at least one adsorbent material in said pre-regeneration zone of said at least one contactor, to form a reflux stream enriched in said first component relative to said feed stream, recovering said reflux stream from said at least one contactor, admitting said reflux stream into a reflux zone of at least one contactor, adsorbing at least a portion of said first component in said reflux stream on said at least one adsorbent material in said reflux zone of at least one contactor to form a fourth product stream, and recovering said fourth product stream from said reflux zone of at least one contactor.

3. The process of claim 2, further comprising admitting said pre-regeneration stream into said adsorptive gas separator and said pre-regeneration zone of said at least one contactor at a pressure equal to or greater than a third pressure threshold.

4. The process of claim 3, wherein said third pressure threshold is equal to or greater than said second pressure threshold.

5. The process of claim 2, wherein a pressure in said reflux zone of said at least one contactor is less than a third pressure threshold immediately prior to admitting said reflux stream.

6. The process of claim 2, wherein said pre-regeneration stream is enriched in said second component relative to said feed stream.

7. The process of claim 2, wherein said pre-regeneration stream comprises at least a portion of said first regeneration stream.

8. The process of claim 2, further comprising after step (c), admitting a third regeneration stream into a third regeneration zone of said at least one contactor, desorbing at least a portion of said second component adsorbed on said at least one adsorbent material to form a sixth product stream, and recovering said sixth product stream from said third regeneration zone of said at least one contactor.

9. The process of claim 2, further comprising prior to step (d), admitting a fourth regeneration stream into a fourth regeneration zone of said at least one contactor, desorbing at least a portion of said second component adsorbed on said at least one adsorbent material in said fourth regeneration zone of said at least one contactor to form a seventh product stream, and recovering said seventh product stream from said fourth regeneration zone of said at least one contactor.

10. The process of claim 2, wherein said multi-component fluid mixture comprises a post-combustion gas stream produced by a fuel combustor.

11. The process of claim 2, wherein in step (c), said reduction in pressure is induced by at least one of said first condenser and/or a pump.

12. The process of claim 11, wherein said pump comprises at least one of an ejector, a vacuum pump, and a compressor.

13. The process of claim 2, further comprising in step (c), admitting said purified second product stream into at least one of a pump and a valve to maintain a pressure in said first regeneration zone of said at least one contactor, to a pressure of equal to or less than said second pressure threshold, and recovering said purified second product stream from at least one of said pump and said valve.

14. The process of claim 13, wherein said pump comprises at least one of an ejector, a vacuum pump, and a compressor.

15. The process of claim 2, further comprising admitting said purified second product stream into a second condenser, condensing said second component from said purified second product stream and recovering said purified second product stream from said second condenser.

16. The process of claim 2, further comprising admitting said purified second product stream into a water ring vacuum pump, separating at least a portion of said second component from said purified second product stream.

17. The process of claim 2, wherein said third pressure threshold is equal to or greater than said second pressure threshold.

18. The process of claim 1, further comprising prior to step (a), admitting said multi-component fluid mixture comprising said first component into a steam generator, admitting a water stream into said steam generator, transferring heat from said multi-component fluid mixture to said steam generator and converting said water stream into a high pressure steam stream, recovering at least a portion of said multi-component fluid mixture and said high pressure steam stream from said steam generator, admitting said high pressure steam stream into a first steam turbine and expanding said high pressure steam stream in said first steam turbine forming at least one low pressure steam stream, and recovering said at least one low pressure steam stream from said first steam turbine.

19. The process of claim 18, further comprising employing said at least one low pressure steam stream as at least a portion of said first regeneration stream, or a pre-regeneration stream.

20. The process of claim 1, further comprising, after step a) and prior to step d), fluidly connecting a depressurization zone of said at least one contactor with a pressurization zone of said at least one contactor to reduce the pressure of said depressurization zone of said at least one contactor to a pressure of less than said first pressure threshold and to increase the pressure of said pressurization zone of said at least one contactor to a pressure greater than said second pressure threshold.

21. The process of claim 20, further comprising, prior to step c), admitting at least a pre regeneration stream into said adsorptive gas separator and into a pre-regeneration zone of said at least one contactor, desorbing a portion of the first component adsorbed on the at least one adsorbent material in said pre-regeneration zone of said at least one contactor, to form a reflux stream enriched in said first component relative to said feed stream, recovering said reflux stream from said at least one contactor, admitting said reflux stream into a reflux zone of at least one contactor, adsorbing at least a portion of at least one component adsorbed on said at least one adsorbent material in said reflux zone of at least one contactor to form a fourth product stream, and recovering said fourth product stream from said reflux zone of at least one contactor.

22. The process of claim 21, further comprising admitting said pre-regeneration stream into said adsorptive gas separator and said pre-regeneration zone of said at least one contactor at a pressure equal to or greater than a third pressure threshold.

23. The process of claim 22, wherein said third pressure threshold is equal to or greater than said second pressure threshold.

24. The process of claim 21, wherein a pressure in said reflux zone of said at least one contactor is less than a third pressure threshold immediately prior to admitting said reflux stream.

25. The process of claim 24, wherein said third pressure threshold is equal to or greater than said second pressure threshold.

26. The process of claim 21, wherein said pre-regeneration stream is enriched in said second component relative to said feed stream.

27. The process of claim 21, wherein said pre-regeneration stream comprises at least a portion of said first regeneration stream.

28. The process of claim 20, further comprising, after step c), admitting a third regeneration stream into a third regeneration zone of said at least one contactor, desorbing at least a portion of said second component adsorbed on said at least one adsorbent material to form a sixth product stream, and recovering said sixth product stream from said third regeneration zone of said at least one contactor.

29. The process of claim 20, further comprising, prior to step d), admitting a fourth regeneration stream into a fourth regeneration zone of said at least one contactor, desorbing at least a portion of said second component adsorbed on said at least one adsorbent material in said fourth regeneration zone of said at least one contactor to form a seventh product stream, and recovering said seventh product stream from said fourth regeneration zone of said at least one contactor.

30. The process of claim 20, further comprising, prior to step a), admitting said multi-component fluid mixture comprising said first component into a steam generator, admitting a water stream into said steam generator, transferring heat from said multi-component fluid mixture to said steam generator and converting said water stream into a high pressure steam stream, recovering at least a portion of said multi-component fluid mixture and said high pressure steam stream from said steam generator, admitting said high pressure steam stream into a first steam turbine and expanding said high pressure steam stream in said first steam turbine forming at least one low pressure steam stream, and recovering said at least one low pressure steam stream from said first steam turbine.

31. The process of claim 30, further comprising employing said at least one low pressure steam stream as at least a portion of said first regeneration stream.

32. The process of claim 20, wherein said multi-component fluid mixture comprises a post-combustion gas stream produced by a fuel combustor.

33. The process of claim 20, wherein in step c), said reduction in pressure is induced by at least one of said first condenser and/or a pump.

34. The process of claim 33, wherein said pump comprises at least one of an ejector, a vacuum pump, and a compressor.

35. The process of claim 20, further comprising in step c), admitting said purified second product stream into at least one of a pump and a valve to maintain a pressure in said first regeneration zone of said at least one contactor, to a pressure of equal to or less than a second pressure threshold, and recovering said purified second product stream from at least one of said pump and said valve.

36. The process of claim 35, wherein said pump comprises at least one of an ejector, a vacuum pump, and a compressor.

37. The process of claim 20, further comprising admitting said purified second product stream into a second condenser, condensing said second component from said purified second product stream and recovering said purified second product stream from said second condenser.

38. The process of claim 20, further comprising admitting said purified second product stream into a water ring vacuum pump, separating at least a portion of said second component from said purified second product stream.

39. The process of claim 20, further comprising fluidly connecting said depressurization zone of said at least one contactor with a plurality of said pressurization zones of said at least one contactor to reduce the pressure of said depressurization zone of said at least one contactor to a pressure of less than said first pressure threshold and increase the pressure of said plurality of said pressurization zones of said at least one contactor to a pressure greater than said second pressure threshold.

40. The process of claim 1, further comprising, after step c), admitting a third regeneration stream into a third regeneration zone of said at least one contactor, desorbing at least a portion of said second component adsorbed on said at least one adsorbent material to form a sixth product stream, and recovering said sixth product stream from said third regeneration zone of said at least one contactor.

41. The process of claim 40, further comprising, prior to step d), admitting a fourth regeneration stream into a fourth regeneration zone of said at least one contactor, desorbing at least a portion of said second component adsorbed on said at least one adsorbent material in said fourth regeneration zone of said at least one contactor to form a seventh product stream, and recovering said seventh product stream from said fourth regeneration zone of said at least one contactor.

42. The process of claim 40, further comprising, prior to step a), admitting said multi-component fluid mixture comprising said first component into a steam generator, admitting a water stream into said steam generator, transferring heat from said multi-component fluid mixture to said steam generator and converting said water stream into a high pressure steam stream, recovering said at least a portion of multi-component fluid mixture and said high pressure steam stream from said steam generator, admitting said high pressure steam stream into a first steam turbine and expanding said high pressure steam stream in said first steam turbine forming at least one low pressure steam stream, and recovering said at least one low pressure steam stream from said first steam turbine.

43. The process of claim 42, further comprising employing said at least one low pressure steam stream as at least a portion of said first regeneration stream.

44. The process of claim 40, wherein said multi-component fluid mixture comprises a post-combustion gas stream produced by a fuel combustor.

45. The process of claim 40, wherein in step c), said reduction in pressure is induced by at least one of said first condenser and/or a pump.

46. The process of claim 45, wherein said pump comprises at least one of an ejector, a vacuum pump, and a compressor.

47. The process of claim 40, further comprising in step c), admitting said purified second product stream into at least one of a pump and a valve to maintain a pressure in said first regeneration zone of said at least one contactor, to a pressure of equal to or less than a second pressure threshold, and recovering said purified second product stream from at least one of said pump and said valve.

48. The process of claim 47, wherein said pump comprises at least one of an ejector, a vacuum pump, and a compressor.

49. The process of claim 40, further comprising admitting said purified second product stream into a second condenser, condensing said second component from said purified second product stream and recovering said purified second product stream from said second condenser.

50. The process of claim 40, further comprising admitting said purified second product stream into a water ring vacuum pump, separating at least a portion of said second component from said purified second product stream.

51. The process of claim 1, further comprising, prior to step d), admitting a fourth regeneration stream into a fourth regeneration zone of said at least one contactor, desorbing at least a portion of said second component adsorbed on said at least one adsorbent material in said fourth regeneration zone of said at least one contactor to form a seventh product stream, and recovering said seventh product stream from said fourth regeneration zone of said at least one contactor.

52. The process of claim 1, further comprising, prior to step a), admitting said multi-component fluid mixture comprising said first component into a steam generator, admitting a water stream into said steam generator, transferring heat from said multi-component fluid mixture to said steam generator and converting said water stream into a high pressure steam stream, recovering said at least a portion of multi-component fluid mixture and said high pressure steam stream from said steam generator, admitting said high pressure steam stream into a first steam turbine and expanding said high pressure steam stream in said first steam turbine forming at least one low pressure steam stream, and recovering said at least one low pressure steam stream from said first steam turbine.

53. The process of claim 52, further comprising employing said at least one low pressure steam stream as at least a portion of said first regeneration stream.

54. The process of claim 52, wherein said multi-component fluid mixture comprises a post-combustion gas stream produced by a fuel combustor.

55. The process of claim 52, wherein in step c), said reduction in pressure is induced by at least one of said first condenser and/or a pump.

56. The process of claim 55, wherein said pump comprises at least one of an ejector, a vacuum pump, and a compressor.

57. The process of claim 52, further comprising in step c), admitting said purified second product stream into at least one of a pump and a valve to maintain a pressure in said first regeneration zone of said at least one contactor, to a pressure of equal to or less than a second pressure threshold, and recovering said purified second product stream from at least one of said pump and said valve.

58. The process of claim 57, wherein said pump comprises at least one of an ejector, a vacuum pump, and a compressor.

59. The process of claim 52, further comprising admitting said purified second product stream into a second condenser, condensing said second component from said purified second product stream and recovering said purified second product stream from said second condenser.

60. The process of claim 50, further comprising admitting said purified second product stream into a water ring vacuum pump, separating at least a portion of said second component from said purified second product stream.

61. The process of claim 1, wherein said multi-component fluid mixture comprises a post-combustion gas stream produced by a fuel combustor.

62. The process of claim 1, wherein in step c), said reduction in pressure is induced by at least one of said first condenser and/or a pump.

63. The process of claim 62, wherein said pump comprises at least one of an ejector, a vacuum pump, and a compressor.

64. The process of claim 62, further comprising in step c), admitting said purified second product stream into at least one of a pump and a valve to maintain a pressure in said first regeneration zone of said at least one contactor, to a pressure of equal to or less than a second pressure threshold, and recovering said purified second product stream from at least one of said pump and said valve.

65. The process of claim 64, wherein said pump comprises at least one of an ejector, a vacuum pump, and a compressor.

66. The process of claim 62, further comprising admitting said purified second product stream into a second condenser, condensing said second component from said purified second product stream and recovering said purified second product stream from said second condenser.

67. The process of claim 62, further comprising admitting said purified second product stream into a water ring vacuum pump, separating at least a portion of said second component from said purified second product stream.

68. The process of claim 1, further comprising in step c), admitting said purified second product stream into at least one of a pump and a valve to maintain a pressure in said first regeneration zone of said at least one contactor, to a pressure of equal to or less than a second pressure threshold, and recovering said purified second product stream from at least one of said pump and said valve.

69. The process of claim 68, wherein said pump comprises at least one of an ejector, a vacuum pump, and a compressor.

70. The process of claim 68, further comprising admitting said purified second product stream into a second condenser, condensing said second component from said purified second product stream and recovering said purified second product stream from said second condenser.

71. The process of claim 68, further comprising admitting said purified second product stream into a water ring vacuum pump, separating at least a portion of said second component from said purified second product stream.

72. The process of claim 1, further comprising admitting said purified second product stream into a second condenser, condensing said second component from said purified second product stream and recovering said purified second product stream from said second condenser.

73. The process of claim 72, further comprising admitting said purified second product stream into a water ring vacuum pump, separating at least a portion of said second component from said purified second product stream.

74. The process of claim 1, further comprising admitting said purified second product stream into a water ring vacuum pump, separating at least a portion of said second component from said purified second product stream.

* * * * *